US 12,228,508 B2

(12) United States Patent
Steiner

(10) Patent No.: US 12,228,508 B2
(45) Date of Patent: Feb. 18, 2025

(54) OPTICAL IMAGING SYSTEM

(71) Applicant: Oxford Nanoimaging Limited, Oxford (GB)

(72) Inventor: Matthias Steiner, Oxford (GB)

(73) Assignee: Oxford Nanoimaging Limited, Oxford (GB)

(*) Notice: Subject to any disclaimer, the term of this patent is extended or adjusted under 35 U.S.C. 154(b) by 377 days.

(21) Appl. No.: 17/773,005

(22) PCT Filed: Oct. 27, 2020

(86) PCT No.: PCT/EP2020/080196
§ 371 (c)(1),
(2) Date: Apr. 28, 2022

(87) PCT Pub. No.: WO2021/083905
PCT Pub. Date: May 6, 2021

(65) Prior Publication Data
US 2022/0390367 A1 Dec. 8, 2022

(30) Foreign Application Priority Data

Oct. 29, 2019 (GB) .................................. 1915679

(51) Int. Cl.
*G02B 21/00* (2006.01)
*G01N 21/45* (2006.01)
(Continued)

(52) U.S. Cl.
CPC ......... *G01N 21/45* (2013.01); *G01N 21/6458* (2013.01); *G02B 21/0092* (2013.01); *G02B 21/16* (2013.01); *G01N 2021/6419* (2013.01)

(58) Field of Classification Search
None
See application file for complete search history.

(56) References Cited

U.S. PATENT DOCUMENTS

2008/0084599 A1 4/2008 Knittel
2013/0093871 A1 4/2013 Nowatzyk et al.

FOREIGN PATENT DOCUMENTS

| EP | 3276389 A1 | 1/2018 |
| GB | 2552195 A | 1/2018 |
| WO | WO 2019/110977 A1 | 6/2019 |

OTHER PUBLICATIONS

Combined Search and Examination Report dated Mar. 20, 2020 in connection with GB Application No. 1915679.3.
(Continued)

Primary Examiner — Robert E. Tallman
(74) Attorney, Agent, or Firm — Wolf, Greenfield & Sacks, P.C.

(57) ABSTRACT

An optical system is presented for optically imaging a sample including a nanoscale object. The optical system includes an imaging lens, an illumination source configured to provide an excitation light, a detector and a substrate for supporting the sample. A sample interface, arranged to reflect the excitation light, is formed between the sample and a first side of the substrate facing the sample when the sample is applied on the substrate. The optical imaging system is arranged such that the excitation light is sent into the substrate via the imaging lens and such that the detector receives a reference light and a scattered light. The reference light comprises a part of the excitation light reflected at the sample interface and collected by the imaging lens and the scattered light comprises a part of the excitation light scattered by the nanoscale object and collected by the imaging lens. The optical system is configured such that the nanoscale object is imaged at the detector, in response to the excitation light, by an optical contrast of an interference pattern between the reference light and the scattered light. The substrate comprises an optical coating disposed on the first side of the substrate such that the sample is in contact
(Continued)

with the optical coating when the sample is applied on the substrate. A degree of reflection of the excitation light at the sample interface is such that the optical contrast is larger compared to the optical contrast obtained with the sample interface formed without the optical coating.

29 Claims, 19 Drawing Sheets

(51) Int. Cl.
  *G01N 21/64* (2006.01)
  *G02B 21/16* (2006.01)

(56) References Cited

OTHER PUBLICATIONS

Examination Report dated Mar. 16, 2022 in connection with GB Application No. 1915679.3.

International Search Report and Written Opinion mailed Apr. 19, 2021 in connection with International Application No. PCT/EP2020/080196.

Andrecka et al., Direct observation and control of supported lipid bilayer formation with interferometric scattering microscopy. ACS Nano. Dec. 2013;7(12):10662-70. DOI:10.1021/nn403367c.

Arroyo et al., Interferometric scattering microscopy and its combination with single-molecule fluorescence imaging. Nature protocols. Mar. 2016;11(4):617-33.

Cole et al., Label-free single molecule imaging with numerical aperture-shaped interferometric scattering microscopy. arXiv:1611.05081v1. Nov. 15, 2016. 6 pages. DOI:10.1021/acsphotonics.6b00912.

Cole et al., Label-free single-molecule imaging with numerical-aperture-shaped interferometric scattering microscopy. ACS Photonics. Jan. 2017;4(2):211-6. DOI:10.1021/acsphotonics.6b00912 URL:https://pubs.acs.org/doi/pdf/10.1021/acsphotonics.6b00912.

Kukura et al., High-speed nanoscopic tracking of the position and orientation of a single virus. Nature Methods. Dec. 2009;6(12):923-7. DOI:10.1038/nmeth.1395.

OPTICAL IMAGING SYSTEM

CROSS REFERENCE TO RELATED APPLICATION

This Application is a national stage filing under 35 U.S.C. § 371 of International Patent Application Serial No. PCT/EP2020/080196, filed Oct. 27, 2020, entitled AN OPTICAL IMAGING SYSTEM, and claims foreign priority benefits to British application number 1915679.3, filed Oct. 29, 2019. The entire contents of these applications are incorporated herein by reference in their entirety.

TECHNICAL FIELD

This specification relates to optical imaging.

BACKGROUND

The Interferometric Scattering Microscopy (iSCAT) is an optical technique that enables label-free imaging of individual macromolecules and nanoparticles. An iSCAT microscope can detect unlabelled single molecules in solution with an optical signal strength that is a characteristic for the mass of the detected particles. Such optical mass spectroscopy of individual molecules may be well-suited for studying a wide range of molecular assembly processes including protein-protein interactions and thus has potential applications in fields such as medical diagnosis and drug development. The iSCAT may be used for biosensing i.e. for detection and quantification of bio-markers in is a sample. In particular, iSCAT enables the detection of surface binding events with high sensitivity and enables new label-free biochemical assays based on highly functionalised surfaces and specific binding.

While interferometric scattering microscopy is capable of detecting and weighing unlabeled, single molecules and facilitates the study of molecular assembly properties, the scope of applications may be expanded by combining iSCAT with super-resolution, single molecule fluorescence microscopy.

SUMMARY

According to an aspect of the present invention, there is provided an optical system for optically imaging a sample including a nanoscale object. The optical system comprises an imaging lens, an illumination source configured to provide an excitation light, a detector and a substrate for supporting the sample. A sample interface, arranged to reflect the excitation light, is formed between the sample and a first side of the substrate facing the sample when the sample is applied on the substrate. The optical imaging system is arranged such that the excitation light is sent into the substrate via the imaging lens and such that the detector receives a reference light and a scattered light. The reference light comprises a part of the excitation light reflected at the sample interface and collected by the imaging lens and the scattered light comprises a part of the excitation light scattered by the nanoscale object and collected by the imaging lens. The optical system is configured such that the nanoscale object is imaged at the detector, in response to the excitation light, by an optical contrast of an interference pattern between the reference light and the scattered light. The substrate comprises an optical coating disposed on the first side of the substrate such that the sample is in contact with the optical coating when the sample is applied on the substrate. A degree of reflection of the excitation light at the sample interface is such that the optical contrast is larger compared to the optical contrast obtained with the sample interface formed without the optical coating.

In some implementations, the optical system further includes a first optical element configured to separate a path for the excitation beam into the imaging lens and a path for the reference light and the scattered light into the detector.

In some implementations, the first optical element is configured to be a polarising beam splitter.

In some implementations, the optical system further includes a structured waveplate between the first optical element and the imaging lens. The structured waveplate includes an inner region configured to impart a first retardation to the excitation beam and an outer region configured to impart a second retardation to the excitation beam.

In some implementations, a difference between the first retardation and the second retardation is between $0.7\pi$ and $0.99\pi$.

In some implementations, the second retardation is zero.

In some implementations, an area of the inner region is less than 4 $mm^2$.

In some implementations, the optical system further comprises a quarter wave plate between the first optical element and the imaging lens. The excitation light is s-polarised with respect to an alignment of the polarising beam splitter such that the excitation light is substantially reflected at the first optical element into the imaging lens.

In some implementations, the illumination source comprises a first illumination source and a second illumination source. The first illumination source provides a first excitation light at a wavelength within a first wavelength band, the first excitation light being the excitation light for the reference light and the scattered light. The second illumination source provides a second excitation light at a wavelength within a second wavelength band for a fluorescence excitation of the nanoscale object. The first optical element is further configured to combine the second excitation light with the first excitation light into the imaging lens and to transmit a fluorescence light into the detector such that the nanoscale object is further imaged at the detector by the fluorescence light emitted by the nanoscale object.

In some implementations, the nanoscale object comprises a plurality of groups of fluorophores, each group having a different excitation spectrum. The second illumination source is configured to provide the second excitation light at a plurality of wavelengths for fluorescence excitation of the respective groups.

In some implementations, the first illumination source comprises a superluminescence light emitting diode or a single mode diode laser with a fast current modulation.

In some implementations, the optical system is configured such that the interference pattern and the fluorescence light are received simultaneously on separate parts of a light-sensitive area of the detector.

In some implementations, an angle of incidence of the excitation light is arranged such that a degree of spurious reflection of the excitation light into the detector is reduced.

In some implementations, the optical coating is configured such that the degree of reflection of the excitation light at the sample interface matches a degree of spurious reflection of the excitation light. The spurious reflection corresponds to part the excitation light which is reflected at the interfaces formed within the optical system other than the sample interface and subsequently arrives at the detector.

In some implementations, the optical coating is configured such that the degree of reflection of the excitation light at the sample interface is higher than a degree of spurious reflection of the excitation light at the interfaces formed within the optical system other than the sample interface and lower than the degree of reflection of the excitation light at the sample interface formed without the optical coating.

In some implementations, the optical coating includes an intermediate layer on the first side of the substrate and an external layer on the intermediate layer, arranged to receive the sample when the sample is applied on the substrate.

In some implementations, the intermediate layer comprises one or more of aluminium oxide, $Cl_2CO_3$, hafnium dioxide, $HfO_2$, tantalum pentoxide, $Ta_2O_5$, niobium pentoxide, $Nb_2O_5$, titanium dioxide, $TiO_2$, and silicon dioxide, $SiO_2$.

In some implementations, the intermediate layer comprises a transparent conducting oxide such as indium tin oxide (ITO).

In some implementations, the intermediate layer comprises a transparent conducting oxide.

In some implementations, the external layer comprises silicon dioxide $SiO_2$.

In some implementations, a thickness of the intermediate layer is between 1 and 20 nm, and a thickness of the external layer is between 80 and 200 nm.

In some implementations, a refractive index of the optical coating is larger than a refractive index of the sample.

According to another aspect of the present invention, there is provided a method of optically detecting a sample including a nanoscale object. The method comprises providing the sample on a substrate, providing an excitation light on the sample via an imaging lens. A sample interface, arranged to reflect the excitation light, is formed between the sample and a first side of the substrate facing the sample when the sample is applied on the substrate. The method further comprises receiving a reference light and a scattered light at a detector. The reference light comprises a part of the excitation light reflected at the sample interface and collected by the imaging lens and the scattered light comprises a part of the excitation light scattered by the nanoscale object and collected by the imaging lens. The method further comprises imaging, at the detector, in response to the excitation light, the nanoscale object by an optical contrast of an interference pattern between the reference light and the scattered light. The substrate comprises an optical coating disposed on the first side of the substrate such that the sample is in contact with the optical coating when the sample is applied to the substrate. A degree of reflection of the excitation light at the sample interface is such that the optical contrast is larger compared to the optical contrast obtained with the sample interface formed without the optical coating.

In some implementations, the excitation light is a first excitation light at a wavelength within a first wavelength band. The method further comprises providing a second excitation light at a wavelength within a second wavelength band for a fluorescence excitation of the sample and imaging, at the detector, the nanoscale object by a fluorescence light emitted by the nanoscale object in response to the second excitation light and collected by the imaging lens.

In some implementations, the nanoscale object comprises a plurality of groups of fluorophores, each group having a different excitation spectrum. The second excitation light is at a plurality of wavelengths for fluorescence excitation of the respective groups.

In some implementations, the method further comprises receiving simultaneously the interference pattern and the fluorescence light on separate parts of a light-sensitive area of the detector.

In some implementations, the optical coating is configured such that the degree of reflection of the excitation light at the sample interface matches a degree of spurious reflection of the excitation light. The spurious reflection corresponds to part the excitation light which is reflected at the interfaces formed within the optical system other than the sample interface and subsequently arrives at the detector.

In some implementations, the optical coating is configured such that the degree of reflection of the excitation light at the sample interface is higher than a degree of spurious reflection of the excitation light at the interfaces formed within the optical system other than the sample interface and lower than the degree of reflection of the excitation light at the sample interface formed without the optical coating.

In some implementations, providing the excitation light comprises providing an optical power of the excitation light such that a photon shot noise of the excitation light impinging on the detector dominates a readout noise of the detector and such that an optical power of the excitation light impinging on the detector is below a saturation level of the detector.

In some implementations, the sample comprises an aqueous solution. The method further comprises providing the sample comprises applying the aqueous solution to the substrate.

BRIEF DESCRIPTION OF THE DRAWINGS

Certain embodiments of the present invention will now be described, by way of examples, with reference to the accompanying drawings, in which:

FIG. 3a is a schematic that illustrates an exemplary embodiment of an optical coating to form a sample interface with references to FIG. 2a.

DETAILED DESCRIPTION

In the iSCAT microscope, images result from the interference of two light fields: the scattered field and the reference field. The scattered field is the light that is scattered by the particles inside the illumination volume. Part of the scattered light is collected by the objective and imaged onto a camera. The reference field is the part of the incident light that is reflected by an interface formed by the discontinuity of refractive indices, namely between the substrate supporting a sample containing the particles and the environment of the sample, such as a glass-water interface. The reference light is also guided onto the detector. The scattered and the reference light is spatially separated from the incident light by a beam splitter.

The iSCAT microscopes may have some limitations, affecting the usefulness and commercial prospects of this technology. First, the optical contrast for small biological molecules may be low, which makes it technically difficult to detect small molecules. Secondly, by relying on Rayleigh scattering as contrast mode, the iSCAT can be an unspecific imaging technique.

In this specification, an iSCAT microscope with an optically coated substrate is presented for enhancing the optical contrast of the image. This may provide an economical method to realise a high-contrast iSCAT imaging of individual biological molecules and an easy way of (re-)configuring the apparatus to detect particles of various sizes with optimal signal-to-noise ratios—thus increasing the usefulness of the apparatus. Based on the iSCAT microscope, this specification also presents a setup where the iSCAT imaging mode and the fluorescence imaging mode are combined, by using a system of polychroic and polarisation-dependent mirrors to enable the signals from both the iSCAT imaging and the fluorescence to be imaged onto different parts of the same detector.

Figure 1:
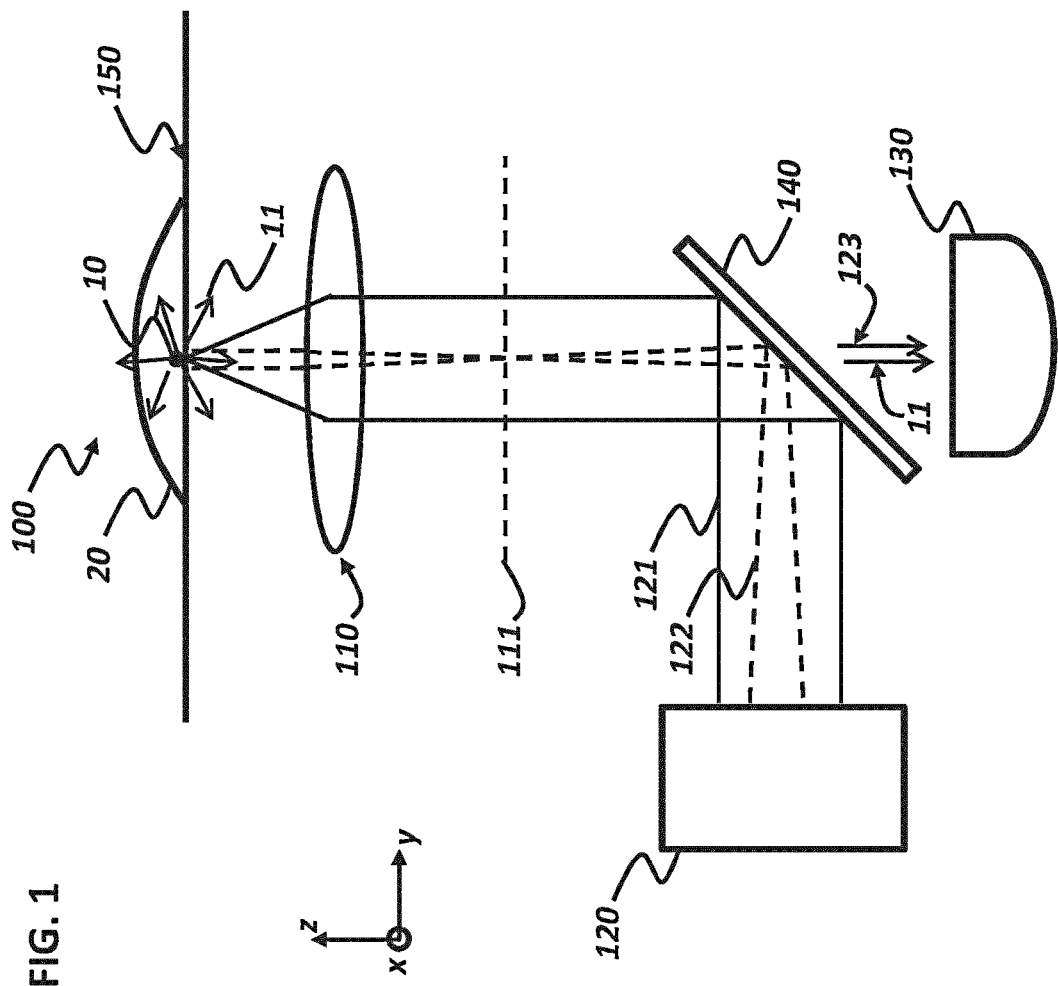
FIG. 1 is a schematic that illustrates an exemplary embodiment of an optical imaging system.

FIG. 1 is a schematic that illustrates an exemplary embodiment of an optical imaging system.

An optical imaging system 100 is configured to detect, image and investigate a specimen or a sample 20 including a nanoscale object 10.

The optical imaging system 100 includes an imaging lens 110, an illumination source 120, a detector 130, and an optical element 140.

The examples of the nanoscale object 10 may include macromolecules, proteins, extracellular vehicles, antigens, lipids, viruses, dye molecules, semiconductor quantum dot, metal nanoparticles, dielectric nanoparticles such as silica nanoparticles and polymer nanoparticles although the nanoscale object 10 is not limited to these examples.

The sample 20 may comprise one or more of the following environments in which the nanoscale object 10 is embedded: aqueous environment, polymer matrix, organic crystal or semiconductor, a dielectric material. The composition of the sample 20 is not limited to these examples as long as the optical properties of the sample 20 allows optical imaging at the wavelengths of the illumination source 120.

The illumination source 120 emits an excitation beam 121, 122. The optical element 140 is configured such that at least part of the excitation beam 121, 122 is at least partially reflected when incident on the optical element 140 and directed to the imaging lens 110. The optical element 140 is further configured to provide an optical path for the light reflected from the sample 20 towards the detector 130, separated from the optical path for the excitation beam 121, 122, as will be explained in more detail below.

A sample interface 150 may be formed by a supporting material or a substrate which holds the sample 20 to be investigated and the sample. For example, in the example of FIG. 1, the sample interface 150 may be formed by a glass-air interface and the nanoscale object 10 may be supported on the glass surface.

Although in the example of FIG. 1 the nanoscale object 10 is on the upper side, a side of the sample interface 150 towards the positive z-direction, of the sample interface 150, the sample 20 including the nanoscale object 10 may be deposited on the lower side of the sample interface 150. For example, the nanoscale object 10 may be deposited on a glass coverslip and the glass coverslip may be mounted such that the side of the glass coverslip with the nanoscale object 10 faces the imaging lens 110. In this case, the sample interface 150 is provided by the air-glass interface, in that the order of air and glass is reversed. For the iSCAT detection scheme, at least part of the excitation beam 121, 122 may be reflected at the sample interface 150 and guided into the detector 130.

In some implementations, the position of the nanoscale object 10 may be adjusted along the direction of the incoming excitation beam 121, 122, along the z-direction in FIG. 1 such that the nanoscale object 10 or the sample interface 150 is near the focal plane of the imaging lens 110 within the focal depth of the imaging lens 110 or equivalently within the focal volume of the imaging lens 110. In this case, the nanoscale object 10 or the sample interface 150 will be referred to be "in focus" or "at the focus" of the imaging lens 110.

In some implementations, the position of the nanoscale object 10 may be adjusted moving the sample interface 150 along z-direction when the nanoscale object 10 is supported by the sample interface 150. For example, when the sample interface 150 is formed by glass-air interface and the nanoscale object 10 is supported on the glass surface, the position of the glass surface in the z-direction may be adjusted by moving the glass on which the nanoscale object 10 is deposited.

The examples of the imaging lens 110 includes an oil immersion objective lens, an air objective lens, aspheric lens, and an achromatic lens although the imaging lens 110 is not limited to these examples. The imaging lens 110 may be configured to provide a tight focusing of the excitation beam 121, 122, such as a diffraction-limited spot, and simultaneously to provide an efficient collection of the emission from the nanoscale object 10.

In some implementations, the illumination source 120 may be arranged such that the excitation beam 121, upon entering the imaging lens 110, is focused at or near the sample interface 150 when the sample interface 150 is at the focus of the imaging lens 110.

For example, the excitation beam 121, represented with a solid line emanating from the illumination source 120 in FIG. 1, is sent into the imaging lens 110 substantially collimated such that the excitation beam 121 is focused at the sample interface 150 or the nanoscale object 10 when the sample interface 150 or the nanoscale object 10 is at the focus of the imaging lens 110. In this case, the width of the excitation beam 121, in the xy-plane, is minimized near the sample interface 150 or the nanoscale object 10. This mode of illumination will be referred to as the confocal illumination in the rest of the specification.

In some implementations, depending on the choice of the imaging lens 110, the spot size of the excitation beam 121 may be arranged to be diffraction-limited. For example, when the imaging lens 110 is an oil immersion objective lens and the sample interface 150 is formed by a glass coverslip and an aqueous sample and the space between the glass coverslip and the oil immersion objective lens 110 is filled with an immersion oil, a near diffraction-limited focal spot can be achieved.

In some implementations, the illumination source 120 may be arranged such that the excitation beam 122, represented as dotted lines in FIG. 1, is focused at or near a back-focal plane in of the imaging lens 110 and upon entering the imaging lens 110, illuminates an area around the nanoscale object 10 on the sample interface 150 such that a relatively large area, in xy-plane, is illuminated simultaneously. Compared to the confocal illumination, the transverse dimension of the area illuminated may be by a factor of ten or larger. For example, when the excitation beam 122 is at a visible wavelength, the illuminated area at the sample interface 150 can be around ten microns across. In this case, the excitation beam 122 is not focused at the focal plane of the imaging lens 110. This mode of illumination will be referred to as the wide-field illumination in this specification.

In some implementations, the illumination source 120 may include more than one excitation wavelength to facilitate more than one detection schemes. In this case, the optical element 140 may be configured to facilitate excitation of the sample 20 with more than one wavelength.

Upon excitation by the excitation beam 121, 122, the nanoscale object 10 may emit light depending on the mode of detection or the detection schemes. For example, the nanoscale object 10 may emit light via fluorescence, Raman scattering and Rayleigh scattering, among others. Each of these schemes may require a different configuration of the illumination source 120, the detector 130 and the optical element 140, as will be discussed in more detail later.

In some implementations, the light emitted by the nanoscale object 10 may be polarised and the dipolar emission pattern of the nanoscale object 10 may be altered because the nanoscale object 10 is positioned close to the sample interface 150. In some implementations, the light emitted by the nanoscale object 10 may be isotropic, substantially uniformly distributed.

At least part of the light emitted by the nanoscale object 10 may be collected by the imaging lens 110. In some implementations, the collection efficiency may depend on the sample interface iso, the numerical aperture of the imaging lens 110, the direction of the dipolar transition of the nanoscale object 10, among others.

The optical element 140 may be configured to accommodate one or more of the detection schemes.

For example, when the nanoscale object 10 is a fluorescent molecule and to be detected by the fluorescence detection scheme, the optical element 140 may be configured as a dichoroic or a polychroic, which is configured to reflect the light at the wavelength of the excitation beam 121, 122 incident on the optical element 140 and transmit the light at at least one of the wavelengths of the fluorescence light emitted from the nanoscale object 10. The fluorescence light collected by the imaging lens no may arrive at the detector 130 after being transmitted at the optical element 140.

For another example, when the nanoscale object 10 is a scattering nanoparticle and to be detected by the iSCAT detection scheme, the optical element 140 may be configured as a beam splitter or a polarisation beam splitter at the wavelength of the excitation beam 121, 122 and of the scattered light from the nanoscale object 10. Both the reflected excitation beam 121, 122 and the scattered light may reach the detector 130 after being transmitted at the optical element 140.

The sample 20, including the nanoscale object 10, at the sample interface 150, when it is at the focus of the imaging lens no, is optically imaged onto the detector 130. It is understood that additional optics for imaging may be introduced as necessary in addition to the components described in FIG. 1. For example, when the imaging lens no is infinity corrected, a tube lens is included either within the detector 130 or in the beam path between the optical element 140 and the detector such that the sample interface 150 and the nanoscale object 10 are optically imaged on the detector 130.

In some implementations, the detector 130 may be a single pixel detector such as an avalanche photodiode (APD), a photomultiplier tube (PMT) or a superconducting nanowire single-photon detector (SNSPD). All of the light collected by the imaging lens no and transmitted to the detector 130 may be detected with a single active area of the detector 130. This type of detector may be used with the confocal illumination where the excitation beam 121 is tightly focused on the nanoscale object 10 on the sample interface iso.

The physical size of the nanoscale object 10 may be smaller than the diffraction limited spot of the excitation beam 121, 122 provided by the imaging lens no. In this case, the nanoscale object 10 is imaged on the detector 130 as the diffraction limited spot in case the imaging lens no is configured as such.

In some implementations, the detector 130 may be a multi-pixel detector or a multi-array detector such as a CCD, an EMCCD, a CCD, and a sCMOS. This type of detector may be used with the wide-field illumination where the excitation beam 122 is illuminated on the nanoscale object 10 on the sample interface 150 over a wide area and the collected light over the illuminated area is optically imaged onto the detector 130 over a plurality of pixels.

In some implementations, when the signal of interest comprises the light emitted from the nanoscale object 10, whose wavelength is displaced from the wavelength of the excitation beam 121, 122, the light at the wavelength of the excitation beam 121 is rejected before reaching the detector 130. For example, if the signal of interest is the fluorescence light from the nanoscale object 10, the excitation beam 121, 122 may be reflected from the sample interface 150 or scattered by the sample 20 and transmitted towards the detector 130.

In some implementations, the rejection may be achieved mainly at the optical element 140 by configuring the optical element 140 to reflect or absorb the light at the wavelength of the excitation beam 121, 122.

Alternatively, in some implementations, additional optics may be placed in the beam path, for example, between the optical element 140 and the detector 130, to further reject the light at the wavelength of the excitation beam 121. 122.

In some implementations, when the wavelength range of the signal of interest is known, additional optics may be introduced to further reject the light outside the wavelength range of the signal or interest.

When the signal of interest is at a different wavelength from the wavelength of the excitation beam 121, 122, the signal is registered when the signal overcomes the background counts. The background counts may include the spurious reflection of the excitation beam 121, 122 from various interfaces formed within the optical system wo, spurious emission from the sample 20, which are not rejected and filtered at the optical element 140 and reach the detector 130. For example, when the imaging lens 110 is an objective lens, intra-objective reflections arise from several surfaces inside the objective lens. Although these surfaces are AR coated, each surface has a reflectivity on the order of 0.1% at the wavelength of the excitation beam 121, 122. Therefore, the spurious reflection corresponds to the part the excitation beam 121, 122 which is generated by being reflected at the interfaces formed within the optical system other than the sample interface 150 and subsequently arrives at the detector 130.

The background counts also include readout noise, dark counts or offset counts of the detector 130, which may be present even when no light impinges on the detector 130. Therefore, in this type of detection, the signal of interest is registered on top of the non-ideal, spurious background counts and the signal-to-noise ratio (SNR) may be improved by maximising the collection efficiency at the imaging lens 110 and by suppressing the background counts, namely rejecting all of light reaching the detector 130 other than the light comprising the signal of interest and minimising the spurious counts at the detector 130. In this specification, this type of detection schemes will be referred to as the emission-based detection scheme. For example, the fluorescence detection scheme is an example of the emission-based detection scheme.

In some implementations, in addition to the emission-based detection schemes, the optical imaging system 100 may be also configured for the interferometric scattering microscopy (iSCAT) scheme. In this method, the nanoscale object 10 is detected by the interference pattern between the scattered light from the nanoscale object 10 and the reflected excitation beam 121, 122 reflected at the sample interface 150. The signal from the iSCAT scheme results from the interference between two light fields: the electric field of the scattered light 11 and the electric field of the reference light 123. The scattered light 11 is the light that is scattered by the nanoscale object 10 inside the focal volume at the focus of the imaging lens no. Part of the scattered light 11 is collected by the imaging lens no and imaged onto the detector 130. The reflected excitation beam 121, 122 reflected at the sample interface will be referred to as the reference light 123 for the rest of the specification.

In the iSCAT scheme, the scattered light 11, the signal of interest, and the reflected excitation beam 121, 122, reference light 123, are at the same wavelength. Therefore, the optical element 140 is configured to function as a beam splitter. The scattered light n and the reference light 123 are made to follow a different path and therefore separated from the excitation beam 121, 122 by a beam splitter.

The optical signal detected on the detector 130 is an interferometric signal caused by the interference between the scattered light 11 from the nanoscale object 10 and the reference light 123. The intensity at the detector 130 is given by:

$$I_{det} = |E_{ref} + E_{scat}|^2 = E_{inc}^2 (r^2 + s^2 + 2r\, s\, \cos\varphi).\qquad \text{Equation 1}$$

$E_{inc}$ is the incident electric field, which corresponds to the electric field of the excitation beam 121, 122 at the sample interface 150. s is a unitless parameter related to the particle scattering cross-section and the optical properties of the sample interface 150. $r^2$ is the reflectivity of the sample interface 150. $\varphi$ is the phase difference between the reference light and the scattered light at the detector 130. When the nanoscale objects 10 are weak scatters such as nanoparticles and biomarkers, the term proportional to $s^2$ is negligibly small. In the rest of the specification, the nanoscale object 10 will be regarded as weak scatterers such that the term proportional to $s^2$ is negligible in iSCAT measurement using the optical imaging system 100, unless otherwise noted.

The signal-to-background ratio or optical contrast C for a weak scatterer is defined as $$C = (I_{det} - I_{bg})/I_{bg} = 2s\, \cos\varphi/r.\qquad \text{Equation 2}$$

$I_{det}$ is as given in Eq1 and $I_{bg}$ is $I_{det}$ given in Eq1 when s=0.

The above description applies to both cases of the excitation beam 121, 122, namely both the confocal illumination and the wide-field illumination. For the case of the wide-field illumination, a single pixel at the detector 130 can be considered.

When the sample interface 150 and the nanoscale object 10 to be detected and imaged are both in focus and in a close proximity from each other, the optical path length difference of the scattered light 11 and the reference light 123 are minimised to be smaller than the focal depth of the imaging lens 110 at the excitation wavelength.

However, when the scattered light 11 from the nanoscale object 10 is out of focus, it may still interfere with the reference light because the coherence length of the excitation beam 121, 122 may be longer than the resulting optical path length difference. Also, the excitation beam 121, 122 may be reflected off other interfaces formed within the optical imaging system 100 other than the sample interface 150 and interfere with the scattered light from the nanoscale object. These, spurious interference signals or false signals, may lead to the degradation of the signal-to-noise ratio or axial resolution.

To address this issue, in some implementations, the illumination source 120 may be chosen or configured such that the coherence length of the excitation beam 121, 122 is shorter than the path length difference between the spurious reflection and the excitation beam 121, 122. For example, the illumination source 120 may be configured such that its coherence length is shorter than 100 microns if the path length difference between the spurious reflection and the excitation beam 121, 122 is larger than a millimetre. This may mitigate the interference between the scattered light and the spurious reflection and the spurious interference detected at the detector 130 only contributes as an incoherent background, not as a false signal.

Therefore, although according to equation 2, as r decreases, the optical contrast C can be made arbitrarily large, in practice, this is not the case due to the imperfections in the optical imaging system 100, such as the spurious reflection of the excitation beam 121, 122 reaching the detector 130. These still contribute to the background level on the detector 130 and the corresponding fluctuations contribute to the noise level. Therefore, in case the optical contrast C is to be improved, the reflectivity at the sample interface 150 needs to be adjusted considering the non-idealities or imperfections.

The optical imaging system wo can be configured to accommodate other detection methods than the iSCAT detection scheme by correspondingly configuring the illumination source 120 and the optical element 140, for example one of the emission-based detections. In this case, there can be stray light from the spurious reflection of the excitation beam 121 for the other detection scheme or due to the imperfections of the optical element 140.

For example, if the fluorescence detection scheme is used concurrently with the iSCAT method, the optical element 140 may be arranged to function as a beam splitter for the iSCAT mode and simultaneously to function as a dichroic mirror for the fluorescence mode. The fluorescence light emitted from the nanoscale object 10 is transmitted at the optical element 140 and the reflected excitation beam 121, 122 are either reflected or absorbed at the optical element 140. The degree of rejection of the reflected excitation beam 121, 122 may be imperfect, in which case the optical element may allow some of the reflected excitation light 121, 122 to reach the detector 130. This contributes to the background noise of the fluorescence detection scheme.

The current iSCAT detection schemes may be improved on the following fronts:

The optical contrast may be further enhanced. The particle scattering cross-section of biological molecules depends on the molecular mass; therefore a measurement of the iSCAT contrast can be used to determine the molecular mass of the particle of interest. Since the strength of the scattering is a characteristic of the mass of the nanoscale object 10, the iSCAT method enables label-free imaging of individual macromolecules and nanoparticles. When the reference light 123 is obtained from the sample interface 150 comprising glass-water interface or glass-air interface, the optical contrast may be small for small biological molecules. Since in the iSCAT detection scheme, different molecules can only be distinguished by their optical contrast, i.e. by their mass, a higher optical contrast may lead to a higher specificity in the detection of biological molecules.

The saturation level of the detector 130 may limit the optical power of the excitation beam 121, 122, which may limit the achievable signal-to-noise ratio. In contrast to the emission-based detection schemes discussed above, in the iSCAT detection scheme, the signal of interest is registered as a deviation, either as an increase or decrease, from the power level of the reference light 123. Therefore, to increase the signal-to-noise ratio (SNR), the power level of the reference light 123 impinging on the detector 130 may be high enough such that the contributions from the detected signal from stray light, spurious reflections, detector readout noise are dominated by the reference light 123 impinging on the detector 130. However, the power level of the reference light 123 should be sufficiently below saturation level of the detector 130.

A detector 130 suitable for the emission-based detection may not be suitable for the iSCAT detection scheme. When the optical imaging system wo is configured to accommodate more than one detection schemes including the iSCAT detection scheme and one or more of the emission-based detection schemes, such as fluorescence detection, dedicated detectors 130 for the iSCAT detection and for the emission-based detection may be needed. This is because in order to achieve a high signal-to-noise ratio with a signal with a low power level, the emission-based detection often employs a detector 130 with a low saturation level, which may not be compatible with the power level of the reference light 123 of the iSCAT detection scheme.

The current specification provides an optical imaging system wo which addresses the issues discussed above. In particular, in the optical imaging system 100, the reflectivity at the sample interface 150 is configured such that the reference light 123 is decreased to a level where the iSCAT scheme is compatible with the detector 130 used for emission-based detection schemes. Therefore, one detector 130 may be used both for the iSCAT detection scheme and an emission-based detection scheme, such as fluorescence detection.

As the reflectivity of the sample interface 150 decreases, the level of the power of the reference light 123 impinging on the detector 130 also decreases. This leads to an improved optical contrast compared to the case where the sample interface 150 is untreated, for example, a glass-water interface.

Furthermore, with the decreased reflectivity at the sample interface iso, the signal-to-noise ratio of the iSCAT detection scheme may be improved because a larger power of the excitation beam 121, 122 can be used without saturating the detector 130. Therefore, the reflectivity of the sample interface 150 may be determined to optimise the signal-to-noise ratio, considering the available power of the excitation beam 121, 122 and the corresponding power level of the reference light 123 impinging on the detector 130. This will be discussed in more detail later.

As a concrete example illustrating the above concept, the optical imaging system wo which facilitates a concurrent operation of the iSCAT detection scheme and the fluorescence detection scheme will be described below. A procedure to determine the reflectivity of the sample interface 150 will be discussed. The design of the optical coating on the sample interface 150 and the optical element 140 will follow.

Figure 2A:
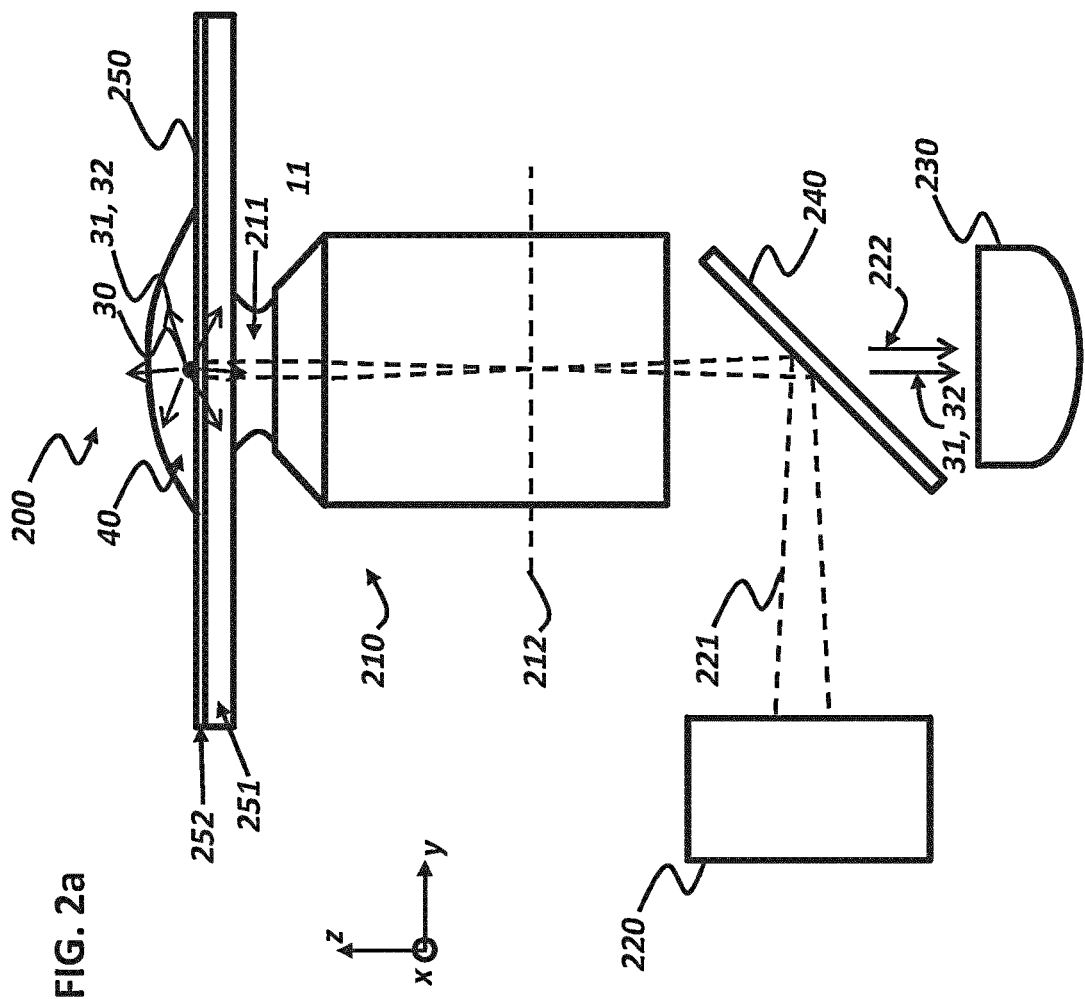
FIG. 2a is a schematic that illustrates an exemplary embodiment of an optical imaging system.

FIG. 2a is a schematic that illustrates an exemplary embodiment of an optical imaging system.

The optical imaging system 200 includes an imaging lens 210, an illumination source 220, a detector 230, an optical element 240. The optical imaging system 200 may be configured for the iSCAT detection scheme and the fluorescence detection scheme, as discussed below.

In some implementations, the detector 230 may be a multi-pixel detector or a multi-array detector such as a CCD, an EMCCD, a CCD and a sCMOS. In some implementations, one and the same detector 230 may be used for both the iSCAT detection scheme and the fluorescence detection scheme.

In some implementations, the imaging lens 210 may be a high-magnification, high-numerical aperture lens or lens system such as an oil immersion objective lens, an air objective lens, aspheric lens, and an achromatic lens. In this example, the imaging lens 210 may be a high-NA oil immersion objective lens.

A sample 40 may include one or more of nanoscale objects 30. For example, the sample 40 may be an aqueous solution deposited and supported on a substrate 251, for example a glass coverslip. The substrate 251 may comprise a material which is substantially transparent at the wavelength of excitation and at the wavelength of the signal of interest, emitted from the nanoscale object 30.

FIG. 2a only shows one nanoscale object 30 within the sample 40, an aqueous solution, for illustration purposes. However, it is understood that the sample 40 can contain an arbitrary number of the nanoscale objects 30 as necessary.

The substrate 251 includes an optical coating 252 on a side facing the sample 40 such that the optical coating 252 is disposed between the substrate 251 and the sample 40. The optical coating 252 may be in direct contact with the aqueous solution. The optical coating 252 may be directly deposited on a side of the substrate 251.

A sample interface 250 may be formed between the optical coating 252 and the sample 40. The sample interface 250 may lead to the reflection of incident light due to the arrangement of the refractive indices of the sample interface 250.

For example, if the sample 40 is an aqueous solution and the substrate 251 is a glass coverslip without any optical coating 252, the sample interface 250 may correspond to a glass-water interface. In this case, the reflection is due to the Fresnel reflection at the glass-water interface.

For another example, the optical coating 252 may be a Bragg reflector including a plurality of dielectric layers, designed in view of the refractive indices of the substrate 251 and the sample 40.

The sample interface 250 which determines the degree of reflection of the excitation beam 221, may vary depending on the material choices of the substrate 251 and the sample 40, in addition to the design of the optical coating 252, as will be described later.

In some implementations, the space between the substrate 251 and the imaging lens 210 may be arranged such that the number of interfaces leading to Fresnel reflection is minimised and Fresnel reflection at remaining interfaces is mitigated. For example, the gap between the substrate 251 and the imaging lens 210 may be filled with an immersion oil 211 for index-matching.

If the sample 40 includes an aqueous solution, when the sample interface 250 is positioned at the focus of the imaging lens 210, the nanoscale objects 30 may move around within the aqueous solution of the sample 40 and may be detected when they move close to the sample interface 250 and the illuminated area, or equivalently within the illumination volume or the focal volume.

In some implementations, the illumination source 220 may include a plurality of light sources or a plurality of excitation wavelengths to facilitate more than one detection schemes or to facilitate more than one type of nanoscale objects 30, emitting light at different wavelengths.

In this example, the illumination source 220 includes an excitation source for the iSCAT detection scheme and the fluorescence detection scheme. For the fluorescence detection scheme, the illumination source 220 may include more than one excitation wavelengths to facilitate the use of a plurality of fluorophores with different fluorescence spectra for multi-colour fluorescence detection.

Also in this example, the illumination provides the excitation light 221 such that the sample 30 is excited by wide-field illumination by focusing the excitation light 221 at the back focal plane 212 of the imaging lens, an oil immersion objective lens. In case the illumination source 220 includes a plurality of light sources, the multiple beams may be arranged to follow substantially the same path of the excitation light 221 described in FIG. 2a, represented by dotted lines for the wide-field illumination at the sample 40.

At the sample interface 250, an excitation beam 221 emanating from the illumination source 220 is reflected. A reference light 222 is the part of the excitation beam 221 that is reflected by the sample interface 250. The degree of reflection may be dependent on the optical coating 252, the refractive index of the substrate 251, and the refractive index of the sample 40.

When the sample interface 250 is positioned near the focus of the imaging lens 210, the reference light 222 is guided towards the detector 230.

When the nanoscale object 30 moves within the focal volume of the imaging lens 210 and within the illuminated area of the excitation beam 221, a scattered light 31 and an emission light 32 emanating from the nanoscale objects 30 collected by the imaging lens 210 is guided towards the detector 230.

In some implementations, the scattered light 31 may comprise light due to scattering processes. For scattering processes such as Rayleigh scattering or Mie scattering of the excitation beam 221, the scattered light 31 may be at the same wavelength as the excitation beam 221. Although for scattering processes such as Raman scattering, the scattered light 31 may be at a different wavelength than the excitation beam 221, in this specification the scattered light 31 is taken to be at the same wavelength as the excitation beam 221, unless otherwise noted.

In some implementations, the emission light 32 may comprise light originating from photophysical process of the nanoscale object 30 in response to absorbing part of the excitation beam 221. The emission light 32 may not maintain a coherent phase relationship with the excitation beam 221 therefore may not lead to any interference pattern with the reference light 222. For example, the emission light 32 may comprise emission via fluorescence, phosphorescence or emission arising from electron-hole recombination. For simplicity, the emission light 32 will be used in this specification as, or interchangeably with the fluorescence light 32. However, the fluorescence light 32 is used to refer to the part of the emission from the nanoscale object 30 which does not lead to interference pattern with the excitation beam 221. Therefore, the fluorescence light 32, for example, includes red-shifted emission from the colloidal quantum dots or phosphorescence from a phosphor molecule.

When the sample interface 250 is positioned at the focus of the imaging lens 210 and the nanoscale object 30 is within the focal volume of the imaging lens 210, the reference light 222, the scattered light 31 and the emission light 32 follow substantially the same optical path starting from the sample interface 250 to the detector 230. In this case, the difference in optical path lengths between the reference light 222 and the scattered light 31 or between the reference light 222 and the emission light 32 may be less than the length of the coherence length of the reference light 222.

The optical contrast and the signal-to-noise ratio of the iSCAT detection scheme will be presented in terms of various parameters describing the optical imaging system 200. Based on these descriptions, the target reflectivity of the sample interface 250 to optimise the signal-to-noise ratio of the iSCAT detection scheme will be derived.

The number of detection events registered at a pixel of the detector 230 is estimated by $$N_{det} = T_{exp} N_{inc} \eta P_{area}/M^2 |r + e^{i\varphi}\mathrm{sqrt}(\varepsilon)s|^2 + T_{exp} N_{inc} \eta P_{area}/M^2 \alpha + T_{exp}\beta + \gamma \quad \text{Equation 3}$$

$T_{exp}$ exposure time; typical values: 1 μs to 1 s $N_{inc}$: number of incident photons per second onto sample (unit: [photons/s/m$^2$]); typical range in optical power: 0.1 to 100 kW/cm$^2$ η: optical throughput (includes the transmission of the optical system from glass substrate to camera and the quantum efficiency of the detector 130, 230); typical value: 0.25

$P_{area}$: CMOS camera pixel area; typical value: 100 μm$^2$

M: magnification of microscope; typical value: 100

ε: collection efficiency of scattered light; typical value: 0.35 s: unitless parameter related to the particle scattering cross-section; typical value: 4×10$^{-5}$ for a 150 kDA protein α: spurious reflections caused by iSCAT illumination light; typical value: 10$^{-5}$ β: stray light from sources other than iSCAT illumination light; typical value: 100 [counts/s]

γ: readout offset counts of detector 230; typical value: 400 [counts/s]

From Equation 3, the optical contrast or the signal-to-background ratio can be calculated by comparing the number of detected photons with and without the nanoscale object 30. The optical contrast, or the signal-to-background ratio is given by $$C=(N_{det}-N_{bg})/N_{bg} \qquad \text{Equation 4}$$

$N_{bg}$ are the number of photons detected when the nanoscale object 30 is not present within the volume within the sample 40 which is defined by the overlap of the focal volume of the imaging lens 210 and the illumination area of the excitation beam 221 at the sample interface 250, (i.e. Equation 3 with s=0). In relation to the signal-to-noise ratio, the noise originates from the intensity fluctuations on each pixel, caused for example by the camera readout noise and the photon shot noise. The standard deviation of these fluctuations is estimated by the square root of $N_{det}$ given in equation 3.

$$\sigma_{det}=\text{sqrt}(N_{det}) \text{ and } \sigma_{bg}=\text{sqrt}(N_{bg}) \qquad \text{Equation 5}$$

Sqrt(x) represents a square root of x in this specification. The signal-to-noise ratio (SNR) is estimated by $$SNR=(N_{det}-N_{bg})/\text{sqrt}(\sigma^2_{det}+\sigma^2_{bg}) \qquad \text{Equation 6}$$

To derive the optimal reflectivity of the sample interface 250, therefore the design of the optical coating 252, the details of the optical arrangement of the optical imaging system 200 as well as noise properties of the detector need to be taken into account.

Figure 2B:
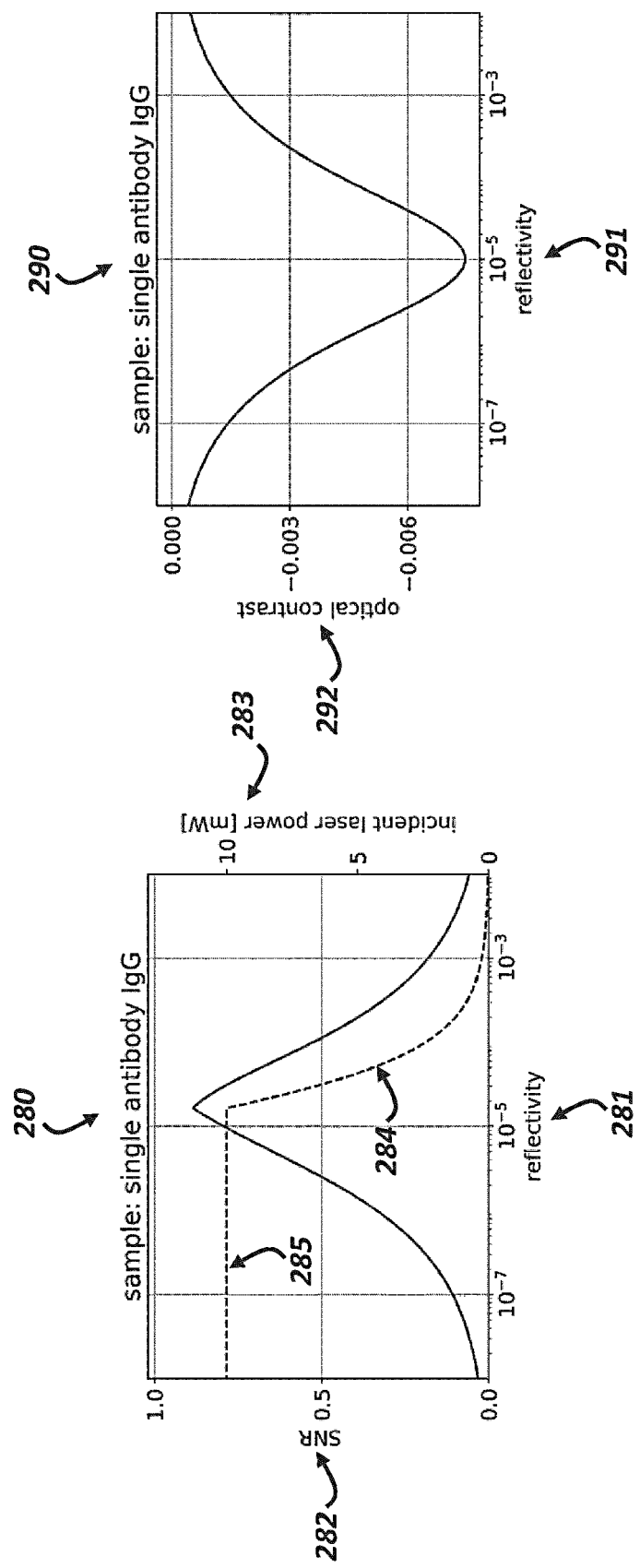
FIG. 2b is a graph that shows the estimation of the optical contrast and the signal-to-noise ratio of the iSCAT detection scheme as a function of the reflectivity at the sample interface.

FIG. 2b is a graph that shows the estimation of the optical contrast and the signal-to-noise ratio of the iSCAT detection scheme as a function of the reflectivity at the sample interface.

The optical contrast is evaluated using equation 4 and the signal-to-noise ratio is evaluated using equation 6. In the evaluation, the nanoscale object 30 is assumed to be IgG antibodies, whose weight is around 150 kDA, corresponding to s=4×10⁻⁵. The rest of the parameters are set as given as typical values in equation 3, except the optical power used, corresponding to $N_{inc}$, is 3 kW/cm².

In particular, in the evaluation of the optical contrast and the signal-to-noise ratio shown in FIG. 2b, the saturation level of the detector 230, a CMOS camera, 30×10³ photo-electrons per frame or per exposure time and the maximum available input power of the illumination source 220, 10 mW at 450 nm were further considered as constraints in the evaluation. Illumination area at the sample interface 250 had a diameter of approximately 10 μm.

A left panel 280 shows a plot of the signal-to-noise ratio, represented in the vertical axis 282 on the left, as a function of the reflectivity at the sample interface 250, represented in the horizontal axis 281.

For every value of the reflectivity, it is assumed that the illumination intensity is adjusted so that the detector 230 operates close to saturation. For example, at a higher reflectivity, for example towards 10⁻², the illumination power is most attenuated from the available power of 10 mW at the illumination source 220, before entering the imaging lens 210 not to saturate the detector 230.

The incident laser power is plotted in the left panel 280 in a dotted line and represented in the vertical axis 283 on the right. In a first range 284, from around 10⁻⁵ reflectivity at the sample interface 250 and higher, the laser power is attenuated to avoid saturation of the detector 230. The incident laser power of the first range 284, adjusted at each reflectivity of the sample interface 250, follows a curve which decreases as the reflectivity increases. Also in the first range 284, the intensity of the light 221 impinging on the detector 230 is close to saturation of the detector 230. Therefore, it may be that the photon shot noise dominates other sources of noises such that the signal-to-noise ratio of the iSCAT detection is near shot-noise-limited.

The plot in the left panel 280 also shows that the signal-to-noise ratio is the highest at a reflectivity of around 2×10⁻⁵ and again decreases as the reflectivity further decreases. This is due to the fact that in a second range 285, from the reflectivity of around 2×10⁻⁵ and lower, even if the full power of 10 mW of the excitation beam 221 is sent into the imaging lens 210, the detector 230 is not operated close to saturation by the reference light 222. Therefore, for the reflectivity in the second range 285, the signal-to-noise ratio of the iSCAT detection may not be limited by the photon shot-noise of the reference light 222 and other noise sources contribute to the noise $\sigma_{det}$ as discussed above in equation 6. Since the intensity of the excitation beam 221 at the sample interface 250 is fixed from using the full power of 10 mW over this range of reflectivity, from around 2×10⁻⁵ to a smaller reflectivity, the signal-to-noise ratio decreases.

A right panel 290 shows a plot of the optical contrast, or the signal-to-background ratio, represented in the vertical axis 292, as a function of the reflectivity at the sample interface 250, represented in the horizontal axis 291. In particular, since the signal of interest is registered as a decrease of intensity from the background level, as discussed above, the optical contrast is plotted as a negative quantity. For example, the optical contrast of 0, the highest point in the vertical axis 292, represents the background level without any interference signal.

For every value of the reflectivity, it is assumed that the illumination intensity is adjusted so that the detector 230 operates close to saturation. As discussed above for the left panel 280, from the reflectivity of around 2×10⁻⁵, full power of 10 mW of the excitation beam 221 can be sent into the imaging lens 210 without saturating the detector 230.

The plot in the right panel 290 shows that the optical contrast is the highest at a reflectivity of 10⁻⁵. From equations 3, when the noise is dominated by the photon shot noise, the terms which are not proportional to $N_{inc}$, such as $T_{exp}*\beta+\gamma$ in equation 3, are negligible. In this limit, from equation 5 the optical contrast is maximised when the reflectivity at the sample interface 250 equals α, which is a dimensionless number representing the spurious reflection of the excitation beam 221 from the interfaces along the beam path other than the sample interface 250 and set to be 10⁻⁵ in this evaluation.

Therefore, in some implementations, when the photon shot noise of the reflected excitation light, for example, terms proportional to $N_{inc}$ in equation 3, impinging on the detector 230 dominates the noise floor, one of the limiting factors to the optical contrast may be the degree of spurious reflections caused by the excitation beam 221, represented by α in equation 3.

The optimal reflectivity or target reflectivity at the sample interface 250 is determined taking into account the following considerations.

According to equation 2, the optical contrast increases when the reflectivity at the sample interface 250 is reduced. Also it can be shown that the signal-to-noise ratio is proportional to the square root of $N_{inc}$, under the same condition. However, these correspond to an idealised case where other spurious sources contributing to the background, for example the degree of spurious reflection α are not considered.

When the terms proportional to $N_{inc}$, namely the reference light 222, proportional to $N_{inc}r^2$ and the spurious reflection, proportional to $N_{inc}$ α, from equation 3, dominate the noise, both the optical contrast and the signal-to-noise ratio are maximised when the reflectivity at the sample interface 250 matches the degree of spurious reflection α.

Assuming that the laser power is adjusted to operate near the saturation value of the detector 230 at every value of the reflectivity at the sample interface 250, it can be shown that both the signal-to-noise ratio and the optical contrast are maximised when the reflectivity at the sample interface 250 is chosen to match the degree of spurious reflection α, as follows.

At every reflectivity r at the sample interface, $N_{inc}$ is set to operate at a maximum possible intensity near but avoiding the saturation of the detector 230, namely $$N_{inc} = N_{sat}/((T_{exp}\eta P_{area}/M^2)(r^2+\alpha))$$ Equation 7

, where $N_{sat}$ is the highest number of photons the detector 230 can detect without significant saturation effects.

Assuming a shot-noise-limited operation, the background $N_{bg}$ is dominated by the reflection at the sample interface 250 $N_{inc}r^2$ and the spurious reflection $N_{inc}\alpha$.

In this case, the signal-to-background ratio or the optical contrast is given by $$C = 2r\, s\, \text{sqrt}(\varepsilon) \cos \varphi/(r^2+\alpha)$$ Equation 8 and the signal-to-noise ratio is given by $$SNR \approx \text{sqrt}(2N_{sat})r\, s\, \text{sqrt}(\varepsilon) \cos \varphi/(r^2+\alpha)$$ Equation 9

According to equations 8 and 9, both the optical contrast and the signal-to-noise ratio are maximised when $r^2=\alpha$. Therefore, in some implementations, the reflectivity at the sample interface 250 may be chosen to match the degree of spurious reflection α if the power of the excitation beam 221 can be adjusted to operate at a maximum possible intensity near but avoiding the saturation of the detector 250. For example, in case the degree of spurious reflection α is smaller than the reflectivity provided by Fresnel reflection originating from the refractive index contrast between the sample 40 and the substrate 251, the reflectivity at the sample interface 250 may be reduced to match the degree of spurious reflection α to enhance the optical contrast, or the signal-to-background ratio and the signal-to-noise ratio.

Starting from the degree of spurious reflection α, the degree of reflection at the sample interface 250, or the optimal reflectivity may be further determined or modified considering the following aspects:

The reflectivity at the sample interface 250 may be determined in view of the available optical power of the illumination source 220 such that the power of the reference light 222, or the reflected excitation beam 221 impinging on the detector 230 is below the saturation level of the detector 230 but high enough. This is such that the photon shot-noise of the reference light 222 dominates or is substantially larger than the other sources of noise, which includes readout offset count of the detector 230, represented as γ, stray light from other light sources, represented as β. Also, the reflectivity at the sample interface 250 may be determined such that the intensity of the illumination light at the sample is low enough to avoid damaging the sample, which causes phototoxicity in biological samples.

In FIG. 2b, in the left panel 280, the signal-to-noise ratio was maximised at a different value of the reflectivity, $2\times10^{-5}$, than the optical contrast in the right panel 290. This is, as explained above, due to the fact that the incident laser power was not intense enough at the reflectivity value matching the degree of spurious reflection α, $10^{-5}$. In this case, the reflectivity of the sample interface 250, and the correspondingly the optical power of the excitation beam 221, can be chosen to maximise the signal-to-noise ratio, i.e approximately $2\times10^{-5}$ in this example, even at the expense of optical contrast. However, any reflectivity lower than the reflectivity without optical coating and higher or equal to the reflectivity that optimises the signal-to-noise ratio is beneficial and increases the imaging sensitivity. Therefore, in some implementations, the reflectivity at the sample interface 250 may be chosen to be higher than the degree of spurious reflection α and lower than the reflectivity at the sample interface 250 without the optical coating 252.

Once the optimal reflectivity or the target reflectivity at the sample interface 250 is determined, the optical coating 252, to be deposited on the substrate 251 to provide the target reflectivity, can be designed.

Figure 3A:
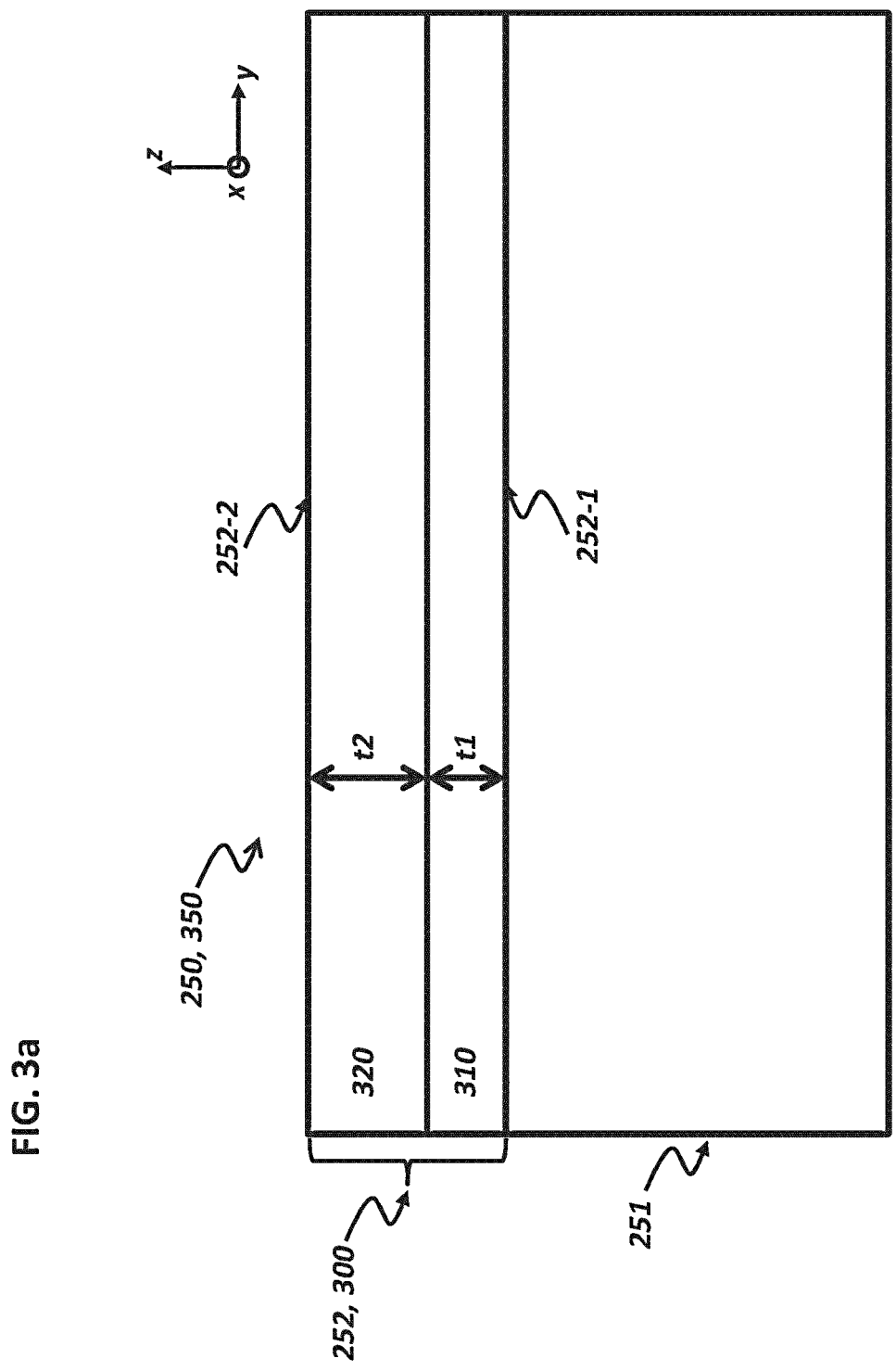

FIG. 3a is a schematic that illustrates an exemplary embodiment of an optical coating to form a sample interface with references to FIG. 2a.

Having identified the optimal target reflectivity, an optical coating 252, 300 is designed taking into account of additional experimental parameters such as the wavelength of the excitation beam 221, the refractive index of the substrate 251, the refractive index of the sample 30, the angle-of-incidence of the excitation beam 221 and biocompatibility of the material.

In some implementations, the wavelength can be between 400 to 800 nm. For example, the wavelength can be 450 nm.

In some implementations, the material of the substrate 251 may comprise borosilicate glass. For example, the substrate 251 may be a borosilicate glass microscope coverslip. In this case, the imaging lens 210, for example, an oil immersion objective lens, may be optically corrected for the thickness and the refractive index of the substrate 251. For another example, the substrate 251 may be a part of a microfluidic channel comprising a material optically transparent at the wavelength of excitation beam 221. For another example, the substrate 251 may be an elastomeric material or thermoplastic material, which is transparent at the excitation wavelength. For another example, the substrate 251 may be a part of glass microscope slide, optical fiber or a prism or a microtiter plate. For another example, the substrate 251 may comprise optically transparent polymer.

A sample interface 250, 350 may be formed between a surface of the substrate 251 to face the sample 40 and an optical coating 252, 300 deposited on the substrate 251. In particular, the sample interface 250, 350 may determine the degree of reflection of the excitation beam 221 towards the detector 230, therefore the intensity or power of the reference light 222.

The optical coating 252, 300 may comprise one or more layers, each layer with a predetermined refractive index. Each layer of the optical coating 252, 300 may be disposed substantially parallel to the face of the substrate 251 facing the sample 30.

In some implementations, the optical coating 252, 300 may comprise a single layer with a uniform refractive index.

The layer of the optical coating 252, 300 in contact with the substrate 251 may have a refractive index different from the refractive index of the substrate 251. In absence of the optical coating 252, 300, the excitation beam 121, 122, 221 may be mainly reflected via Fresnel reflection by the refractive index contrast between the substrate 251 and the sample 40. In this case, the sample interface may be formed by the substrate 251 and the sample 40.

Therefore, the sample interface 250, 350 may be provided by a plane defined by the index contrast between two materials with two different refractive indices. Alternatively, the sample interface may be provided by an optical arrangement near the nanoscale object 30 to be imaged, which contributes to the degree of reflection of the excitation beam 221 near the position of the nanoscale object 30 of the sample 40 when the nanoscale object 30 is in focus. In the example of FIG. 2*a*, the optical arrangement which determines the degree of reflection is provided by the optical coating 252 such as the optical coating 300 presented in FIG. 3*a*.

A first side 252-1 of the optical coating 252, 300 may be directly in contact with the surface of the substrate 251. Alternatively, between the first side 252-1 and the substrate 251, there may be a layer of adhesive, which is used to attach the optical coating 252, 300 to the substrate 251. A second side 252-2 of the optical coating 252, which is not in contact with the surface of the substrate 251 may be exposed towards the sample 40 such that when the sample 40 is applied, the second side 252-2 of the is optical coating 252 is in direct contact with the sample 40.

In some implementations, the optical coating 252, 300 may be fabricated on the substrate 251. For example, the layers included in the optical coating 252, 300 may be deposited on the substrate 251 via one or more fabrication techniques including ion-beam sputtering, sputter deposition such as physical vapour deposition, atomic layer deposition or spin coating. Any known techniques to form a dielectric layer or an organic/inorganic layer may be used to fabricate the optical coating 252, 300 on the substrate 251.

Alternatively, the optical coating 252, 300 may be fabricated separate from the substrate 251, for example, on a separate substrate, and subsequently transferred on the surface of the substrate 251. In this case, the optical coating 252, 300 may be attached to the substrate via van der Waals bonding or using a thin layer of adhesive.

The optical coating 252, 300 may have a refractive index or an effective refractive index different to those of the sample 40 and the substrate 251. The optical coating 252, 300 may alter the reflectivity of the excitation beam 221 incident on the substrate 251, for example, travelling in positive z-direction, at the sample interface 250, 350 from the reflectivity given from the sample interface 250, 350 formed by the substrate 251 and the sample 40.

The angle-of-incidence of the excitation beam 221 may deviate from 0 degree with respect to the central axis of the imaging lens 210, along the z-direction, and may be less than 10 degrees. The angle-of-incidence of the excitation beam 221 may be chosen to alleviate the spurious reflections, quantified above as a by reducing the overlap between the spurious reflection and the reference light 222. In some implementations, the optical coating 252, 300 may be designed taking the angle-of incidence of the excitation beam 221 into consideration.

In some implementations, the optical coating 252, 300 may comprise two or more layers 310, 320. In this case, the number of layers and the refractive indices of the layer 310, 320 may be chosen such that the reflectivity is adjusted close to the target reflectivity due to the interference effects of the layers 310, 320.

In some implementations, the optical coating 252, 300 may be designed taking the refractive index of the substrate 251 and the sample 40 into consideration.

In some implementations, the optical coating 252, 300 may be designed considering the physical dimensions of the substrate 251 such as the thickness.

In some implementations, the optical coating 252, 300 may be designed to achieve a reflectivity at the sample interface 250, 350 of 0.1% to 0.001%, for example 0.01%.

In some implementations, the optical coating 252, 300 may be designed to achieve a reflectivity at the sample interface 250, 350 equal to the degree of the spurious reflection, quantified above as a.

In some implementations, the optical coating 252, 300 may comprise a first layer 310 and a second layer 320. By including two layers 310, 320, the coating 252, 300 may be kept simple, inexpensive and thin while the reduction of the reflectivity can be achieved for a particular wavelength and a particular range of angle of incidence.

In some implementations, the first layer 310 may comprise a dielectric material or metal oxides, such as one or more of $Al_2O_3$, $HfO_2$, $Ta_2O_5$, $Nb_2O_5$, $SiO_2$ and $TiO_2$.

In some implementations, the intermediate layer comprises a transparent conducting oxide such as indium tin oxide (ITO).

In some implementations, the thickness t1 of the first layer 310 may be between 1 nm and 20 nm. For example, the first layer 310 may be 6 nm.

In some implementations, the second layer 320 may comprise a material which is non-toxic and highly biocompatible. Since the second layer 320 can be in contact with the sample 40 the material of the second layer 320 may be chosen to be compatible with biological samples and biomedical assays and amenable to surface functionalisation chemistry on the sample interface 250, 350. For example, the second layer 320 may comprise $SiO_2$. However, the surface comprising $Al_2O_3$, $HfO_2$, $Ta_2O_5$, $Nb_2O_5$ and $TiO_2$ may also be functionalised and treated to be biocompatible.

In some implementations, the thickness t2 of the second layer 320 may be between 80 nm and 200 nm. For example, the first layer 310 may comprise $Ta_2O_5$ with a thickness of 4 nm and the second layer 320 comprises $SiO_2$ with a thickness of 106 nm.

In some implementations, when the first layer 310 comprises tantalum pentoxide ($Ta_2O_5$) and the second layer 320 comprises silicon dioxide ($SiO_2$), the thickness of the first layer 310 may be between 1 and 10 nm, and the thickness of the second layer 320 may be between 80 and 200 nm.

An example of the optical coating 252, 300 on the substrate 251 is as follows: the substrate 251 may be a high-precision cover glasses made from borosilicate glass D 263 with thickness No. 1.5H, representing the tolerance in thickness of 170 μm±5 μm. On one side of the substrate 251, the borosilicate glass, $Ta_2O_5$ is deposited as the first layer 310 with a thickness of 4 nm and $SiO_2$ is deposited as the second layer 320 with a thickness of 106 nm, via ion-beam sputtering. The ion-beam sputtering was adopted because it allows a precise thickness control.

Considering further the aforementioned constraints regarding the suitability of materials, the coating, i.e. the number of layers, layer thicknesses and layer materials, is designed using established tools for the design of the optical coating 252, 300. The design, for example numerical optimisation, and the fabrication of the optical coating 252, 300 may be analogous to those for the design and the fabrication of an anti-reflection coating. Therefore, as long as a desired reflectivity can be achieved at the sample interface 250, 350, the implementation of the optical coating 252, 300 is not limited to a two-layer structure on a glass coverslip, as shown in the example of FIG. 3*a*.

Figure 3B:
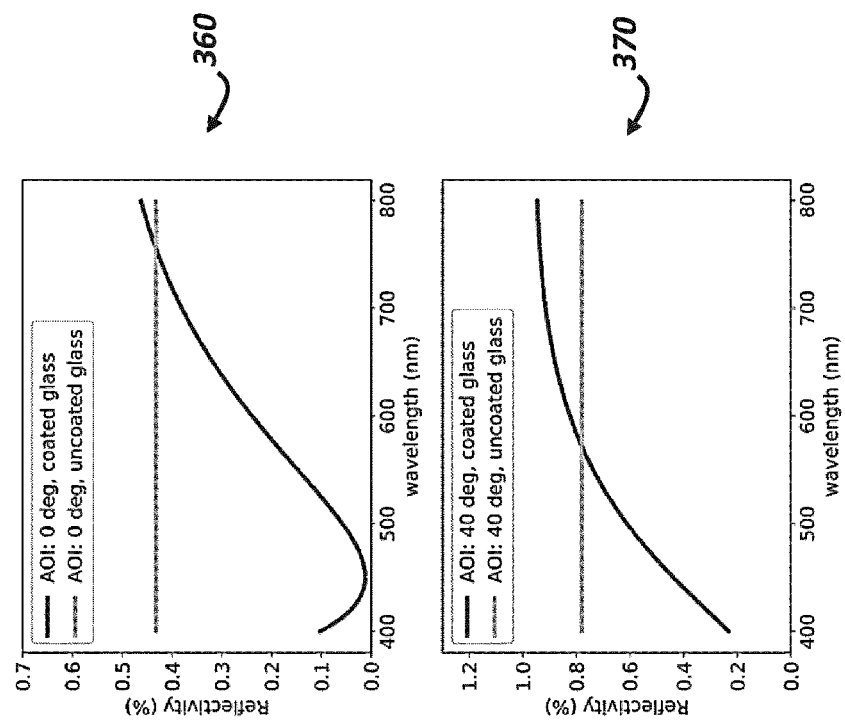
FIG. 3b shows simulation results of the reflectivity of the optical coating.

FIG. 3*b* shows simulation results of the reflectivity of the optical coating.

In the simulation results shown in FIG. 3*b*, the optical coating 252, 300 is assumed to consist of tantalum pentoxide ($Ta_2O_5$) as the first layer 310 with a thickness of 4 nm and silicon dioxide ($SiO_2$) as the second layer 320 with a thickness of 106 nm. It is assumed that water is in contact with the $SiO_2$ layer and the glass coverslip comprises borosilicate glass D.

An upper panel 360 shows a graph which shows the reflectivity at 0 degree angle-of-incidence (AOI) as a function of the wavelength on an untreated glass coverslip, labelled as 'uncoated glass' and on a glass coverslip containing the optical coating 252, 300, labelled as 'coated glass'. At around 450 nm wavelength for the excitation beam 221 of the iSCAT detection scheme, the reflectivity is 0.01%. The reflectivity at 0 AOI can be determined to enhance the optical contrast and the signal-to-noise ratio as explained above. In this example, the optical coating 252, 300 is deposited on the substrate 251 to reduce the reflectivity from 0.43 to 0.01%. From around 600 nm wavelength and higher the reflectivity of the coated glass coverslip approaches the reflectivity of the uncoated glass coverslip.

A lower panel 370 shows a graph which shows the reflectivity at 40 degrees angle-of-incidence (AOI) as a function of the wavelength on an untreated glass coverslip, labelled as 'uncoated glass' and on a glass coverslip containing the optical coating 252, 300, labelled as 'coated glass'. At 40 degrees AOI with a mixed polarisation, at around 450 nm wavelength for the excitation beam 221 of the iSCAT detection scheme, the reflectivity is around 0.8%. From around 550 nm and higher, the reflectivity of the coated coverslip and the uncoated coverslip are close to each other. When the first layer 310 comprises tantalum pentoxide ($Ta_2O_5$) and the second layer 320 comprises silicon dioxide ($SiO_2$), in order to achieve the minimum reflectivity of the optical coating 252, 300 at a wavelength between 400 and 800 nm, the thickness of the first layer 310 may be between 1 and 10 nm and the thickness of the second layer 320 may be between 80 and 200 nm.

Figure 4A:
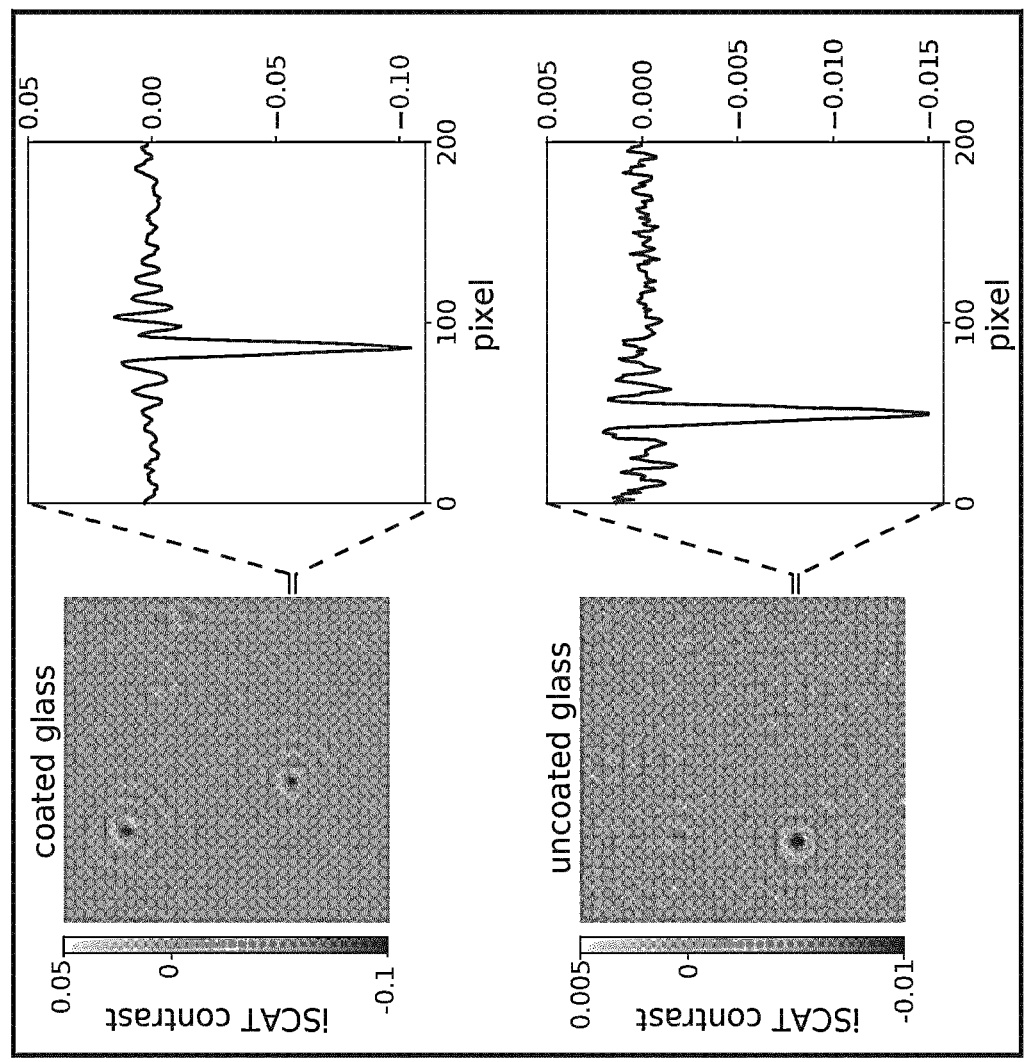
FIGS. 4a and 4b show measurement results obtained using the iSCAT detection scheme.
Figure 4A:
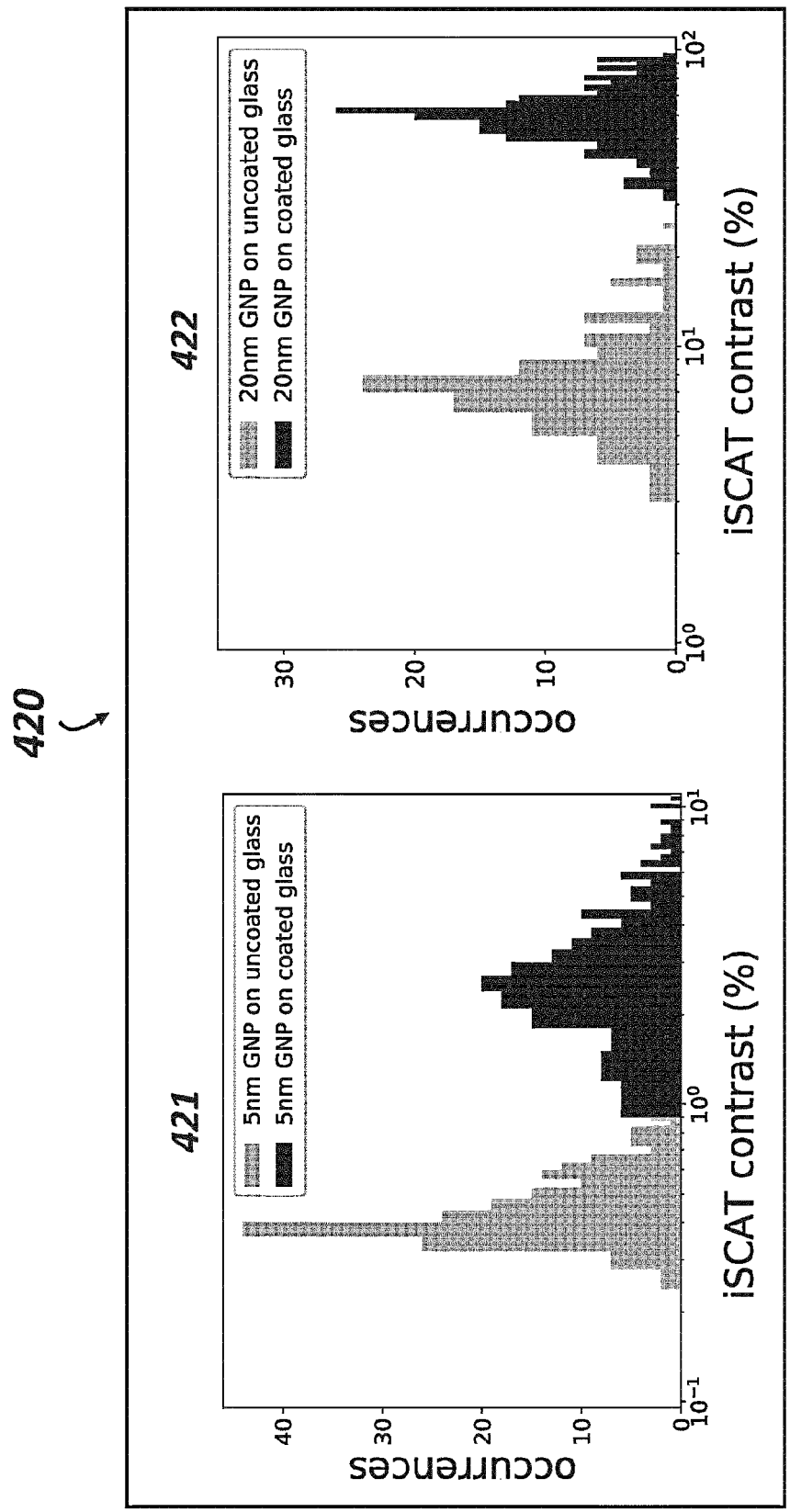
Figure 4A:
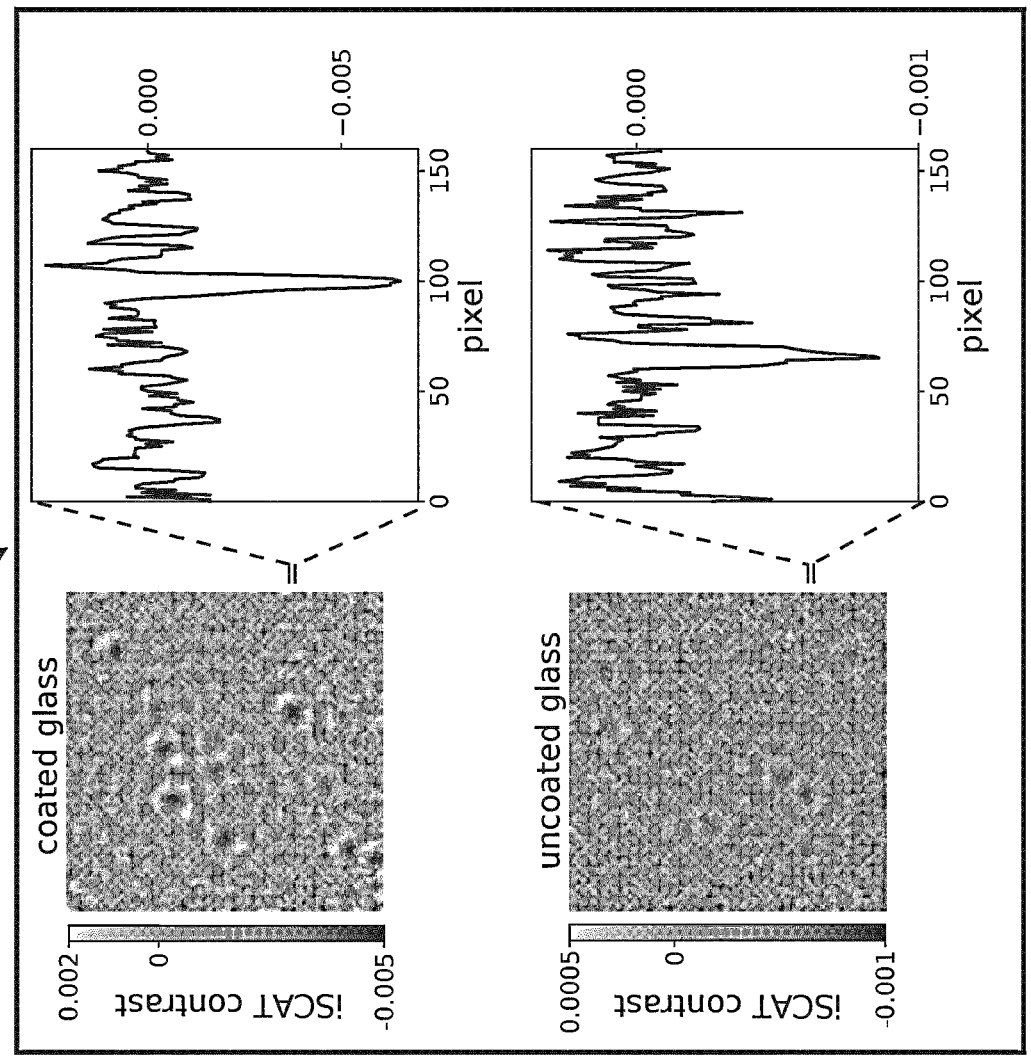
Figure 4A:
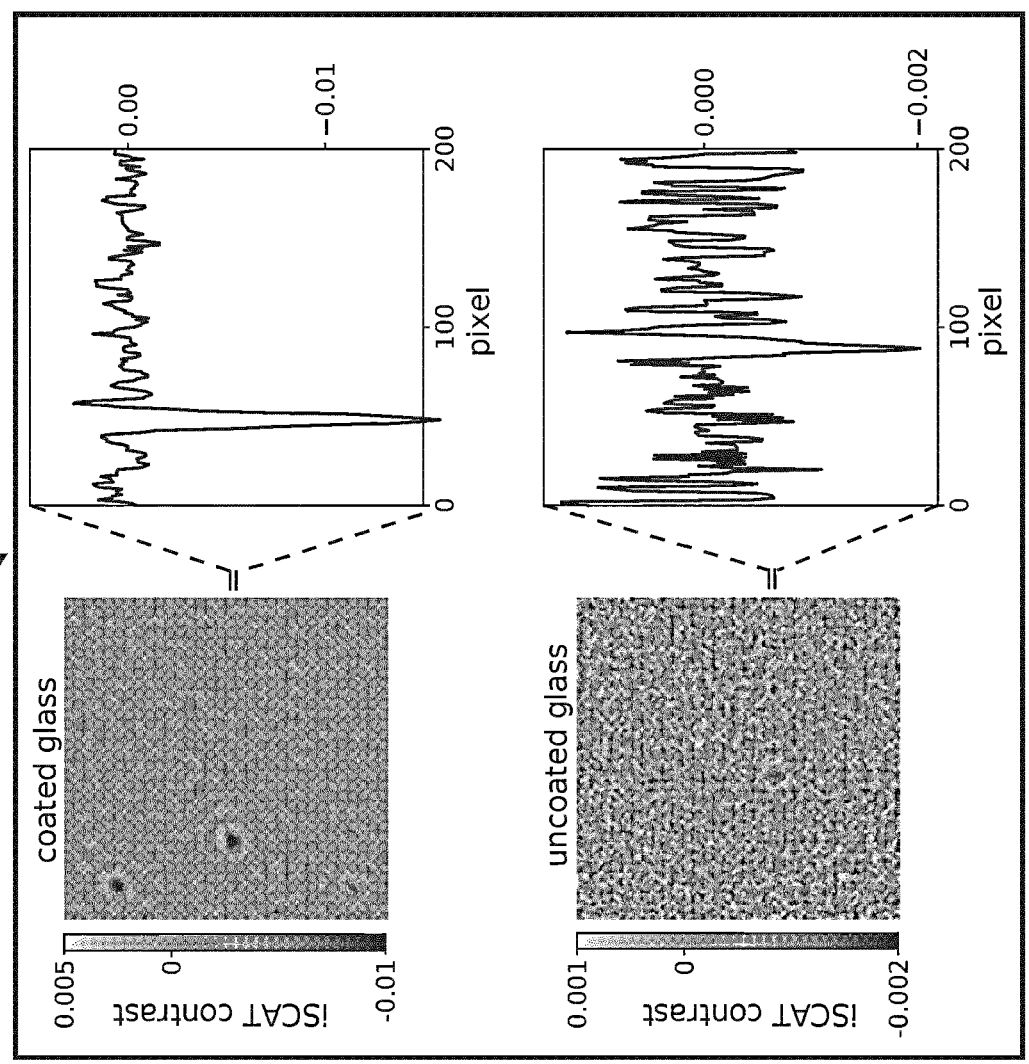
Figure 4B:
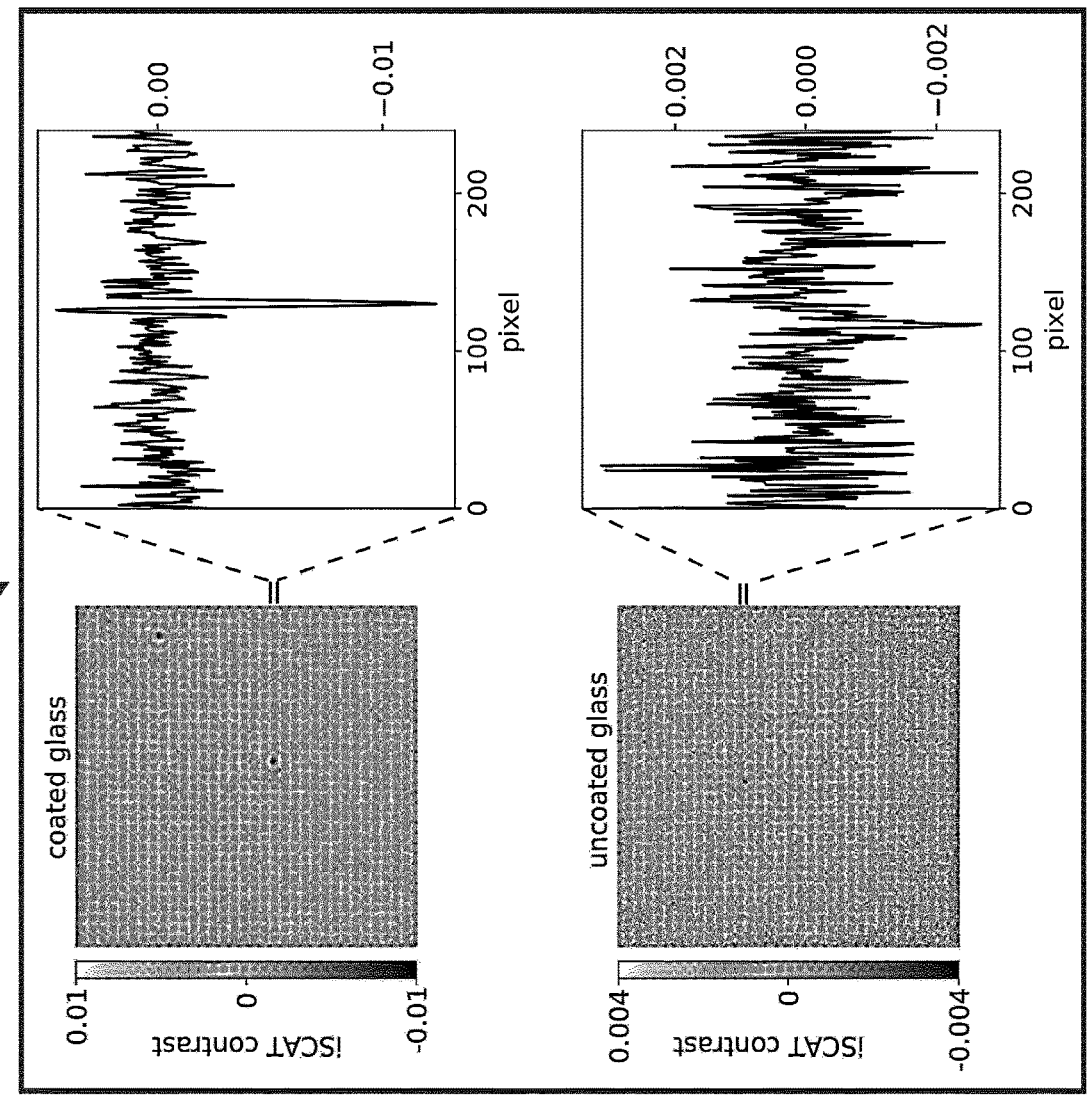
Figure 4B:
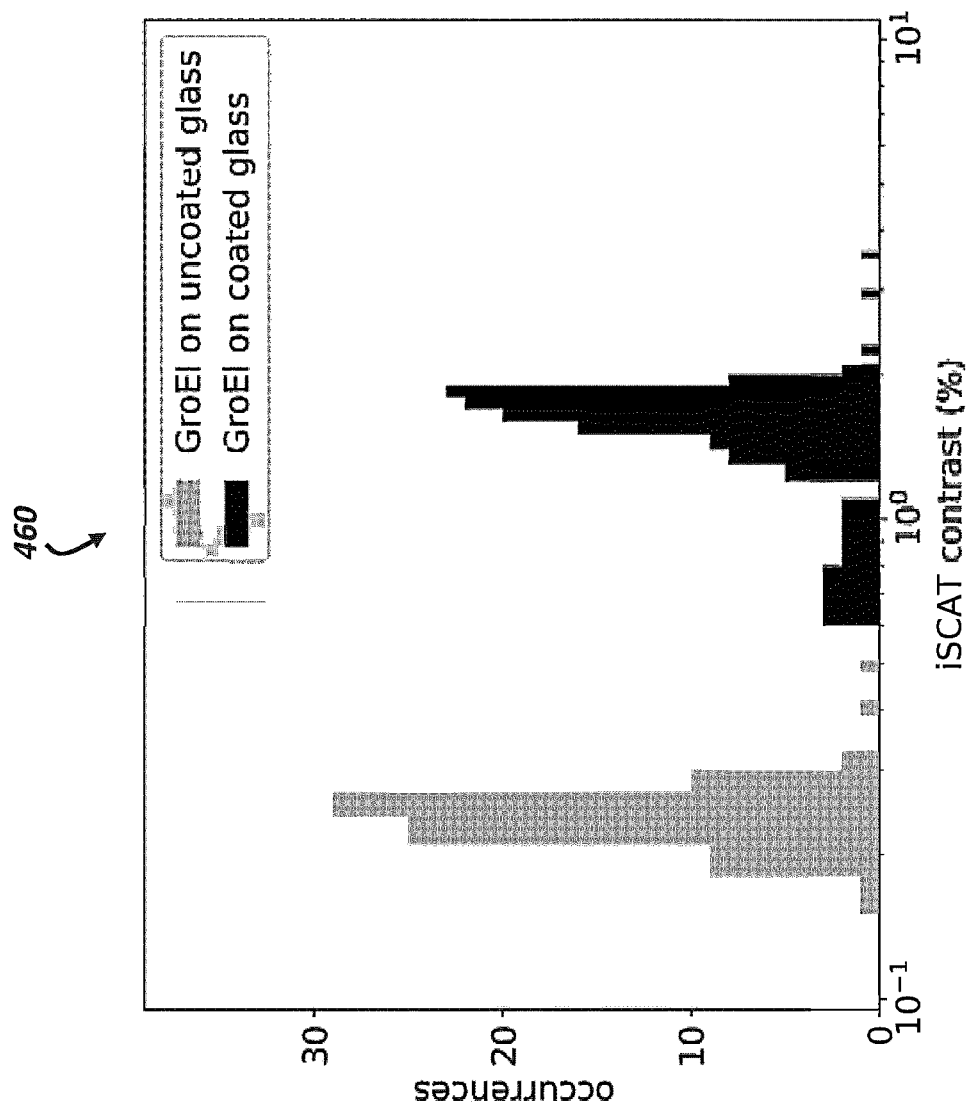

FIGS. 4a and 4b show measurement results obtained using the iSCAT detection scheme.

The experimental results shown in FIGS. 4a and 4b were obtained using the optical imaging system 200 described in FIG. 2a with the following specifications: The imaging lens 210 is a high numerical aperture oil immersion objective lens.

The substrate 251 is a high-precision cover glasses made from borosilicate glass D 263 with thickness No. 1.5H, representing the tolerance in thickness of 170 µm±5 µm. The term "cover glass" and "coverslip" will be used interchangeably.

For the optical coating 252, 300 on the substrate 251, $Ta_2O_5$ was deposited as the first layer 310 with a thickness of 4 nm and $SiO_2$ is deposited as the second layer 320 with a thickness of 106 nm. With such optical coating 252, 300, a reduction in reflectivity at the sample interface 150, 250 by a factor of approximately 50 was obtained compared to a glass-water interface for an illumination wavelength of 450 nm. This corresponds to a reduction of the amplitude of the reference light 123, 222 by about sqrt(50)=7.

In each of the measurement results presented in FIGS. 4a and 4b, an aqueous sample 40 including the nanoscale objects 30 was applied on top of the cover glass 251, both coated or uncoated, to observe the difference in the optical contrast and in the signal-to-noise ratio.

In this specification, the phrase "coated coverslip" will be used to mean the cover glass 251 and the optical coating 252, 300 described above. The phrase "uncoated coverslip" or "untreated glass" will be used to mean the cover glass 251 described above, unless otherwise noted.

As explained above, in the case of "coated cover glass," the sample interface 250, at which the excitation beam 221 is reflected to provide the reference light 222 for the iSCAT detection scheme, is formed by the arrangements of the substrate 251, the optical coating 250, and the sample 40. In the case of "uncoated cover glass," the sample interface 250 is formed by the refractive index contrast of the substrate 251 and the sample 40, in other words, a glass-water interface.

For the measurements in FIGS. 4a and 4b, typical sample concentrations used was a few nM and the same volume were a few uL.

The experimental protocol was as follows:
1. the substrate 251, a coverslip, is mounted on microscope sample stage
2. 50 uL of neat buffer pipetted on the substrate 251
3. Surface of coverslip, the sample interface 150, 250, is brought into focus is of imaging system
4. A few uL of sample solution is added to initial buffer on coverslip
5. The illumination source 220 is switched on
6. At the detector 230, acquisition is started (typically with 300 frames per second)
7. Data post processing: Subsequent camera frames are divided for background suppression; in addition, frames are averaged for further noise reduction. The post-processed images show binding events of the particles to the coverslip surface.

FIG. 4a shows comparison of the measurement results of the optical contrast obtained with and without the optical coating 252, 300 deposited on the substrate 251.

In an upper left panel 410 of FIG. 4a, the nanoscale objects 30 are gold nanoparticles with a nominal mean diameter of 10 nm. Both images, recorded respectively using a coated glass coverslip and an uncoated glass coverslip, comprise 200×200 pixels, corresponding to 6 µm×6 µm on the sample interface 250, 350. The upper image, taken with the coated glass coverslip is an average of 100 frames, each taken with 250 frames per second integration time. The lower image, taken with the uncoated coverslip is an average of 100 frames, each taken with 1000 frames per second integration time.

The measurement result shows that for the uncoated coverslip, the optical contrast is 1-2% while for the coated coverslip, the optical contrast is 8-10%.

An upper right panel 420 of FIG. 4a shows two histograms, a left histogram 421 and a right histogram 422, which show the measurements of the optical contrasts obtained using gold nanoparticles as the nanoscale objects 30.

The left histogram 421 shows statistics of the measurements made with gold particles with a mean diameter of 5 nm. For the untreated glass as the substrate 251, the mean optical contrast is around 0.45%. The number of particles for the measurements with the untreated glass coverslip was 227. For the coated glass as the substrate, the mean optical contrast is around 3.1%. The number of particles for the measurements with the coated glass coverslip was 185. The measurement data suggests that the enhancement of the optical contrast is around sevenfold when the coated glass coverslip is used.

The right histogram 422 shows statistics of the measurements made with gold particles with a mean diameter of 20 nm. For the untreated glass as the substrate 251, the mean optical contrast is around 7.8%. The number of particles for the measurements with the untreated glass coverslip was 114. For the coated glass as the substrate, the mean optical contrast is around 62%. The number of particles for the measurements with the coated glass coverslip was 186. The measurement data suggests that the enhancement of the optical contrast is around eightfold when the coated glass coverslip is used.

For the measurements presented in the upper right panel 420, the imaging lens 210 used was a high numerical aperture oil immersion objective lens with NA 1.40 and a magnification of in.

In a lower left panel 430 of FIG. 4a, the nanoscale objects 30 are Fibrinogen with a mass of 340 kDa. Both images, recorded respectively using a coated glass coverslip and an uncoated glass coverslip, comprise 160×160 pixels, corresponding to 4.7 μm×4.7 μm on the sample interface 250, 350. The upper image, taken with the coated glass coverslip is an average of 100 frames, each taken with 250 frames per second integration time. The lower image, taken with the uncoated coverslip is an average of 1000 frames, each taken with 1000 frames per second integration time. The measurement result shows that for the uncoated coverslip, the optical contrast is around 0.08% and that for the coated coverslip, the optical contrast is around 0.6%. In a lower right panel 440 of FIG. 4a, the nanoscale objects 30 are Thyroglobulin with a mass of 660 kDa. Both images, recorded respectively using a coated glass coverslip and an uncoated glass coverslip, comprise 200×200 pixels, corresponding to 6 μm×6 μm on the sample interface 250, 350. The upper image, taken with the coated glass coverslip is an average of 100 frames, each taken with 250 frames per second integration time. The lower image, taken with the uncoated coverslip is an average of 100 frames, each taken with 1000 frames per second integration time.

The measurement result shows that for the uncoated coverslip, the optical contrast is around 0.2% and that for the coated coverslip, the optical contrast is around 1.5%.

For the measurements presented in the upper left panel 410, the lower left panel 430 and the lower right panel 440, the imaging lens 210 used was a high numerical aperture oil immersion objective lens with NA=1.40 and a magnification of 200. The measurements of FIG. 4a show that the optical coating 252, 300 as part of the sample interface 150, 250, disposed on the substrate 251 enhances the optical contrast compared to the case where the sample interface 150, 250 is formed by the interface between the substrate 251 and the sample 20, 40.

FIG. 4b shows comparison of the measurement results of the optical contrast obtained and the signal-to-noise ratio with and without the optical coating 252, 300 is deposited on the substrate 251.

In a left panel 450 of FIG. 4b, the nanoscale objects 30 are GroEL protein with a mass of 840 kDa. Both images, recorded using a coated glass coverslip and an uncoated glass coverslip, comprise 240×240 pixels, corresponding to 14 μm×14 μm on the sample interface 250, 350. The upper image, taken with the coated glass coverslip is an average of 150 frames, each taken with 500 frames per second integration time. The lower image, taken with the uncoated coverslip is an average of 150 frames, each taken with 500 frames per second integration time. The measurement result shows that for the uncoated coverslip, the optical contrast is 0.24% after 150 frames average and that for the coated coverslip, the optical contrast is around 1.67% after 150 frames average. To estimate the signal-to-noise ratio, the noise was evaluated by the standard deviation of the entire image. The standard deviation for the image with the coated coverslip was 0.13% and the standard deviation for the image with the uncoated coverslip was 0.11%. Regardless of slight increase in the noise level, the signal-to-noise ratio is improved by a factor of 5.9. In a right panel 460 of FIG. 4b, a histogram shows a statistics of the optical contrast obtained with the nanoscale objects 30 are GroEL protein with a mass of 840 kDa with and without the optical coating 252, 300 on the substrate 251.

For the untreated glass as the substrate 251, the mean optical contrast is around 0.24%. The number of particles for the measurements with the untreated glass coverslip was 79. For the coated glass as the substrate, the mean optical contrast is around 1.67%. The number of particles for the measurements with the coated glass coverslip was 128. Therefore, the enhancement of the optical contrast is around sevenfold when the coated glass coverslip is used.

For the measurement results presented in the left panel 450 and the right panel 460, the imaging lens 210 used was a high numerical aperture oil immersion objective lens with NA=1.40 and a magnification of 111.

The measurement results of FIG. 4b shows that the optical coating 252, 300 as part of the sample interface 150, 250, disposed on the substrate 251 enhances the signal-to-noise ratio compared to the case where the sample interface 150, 250 is formed by the interface between the substrate 251 and the sample 20, 40.

In addition to the enhancement the optical contrast and the signal-to-noise ratio of the iSCAT detection schemes, the reduced reflectivity at the sample interface 150, 250 by depositing the optical coating 252, 300 on the substrate may enable simultaneous operation of the iSCAT detection scheme and the fluorescence detection scheme on the same setup using one multi-arrayed detector, as will be discussed below.

Figure 5:
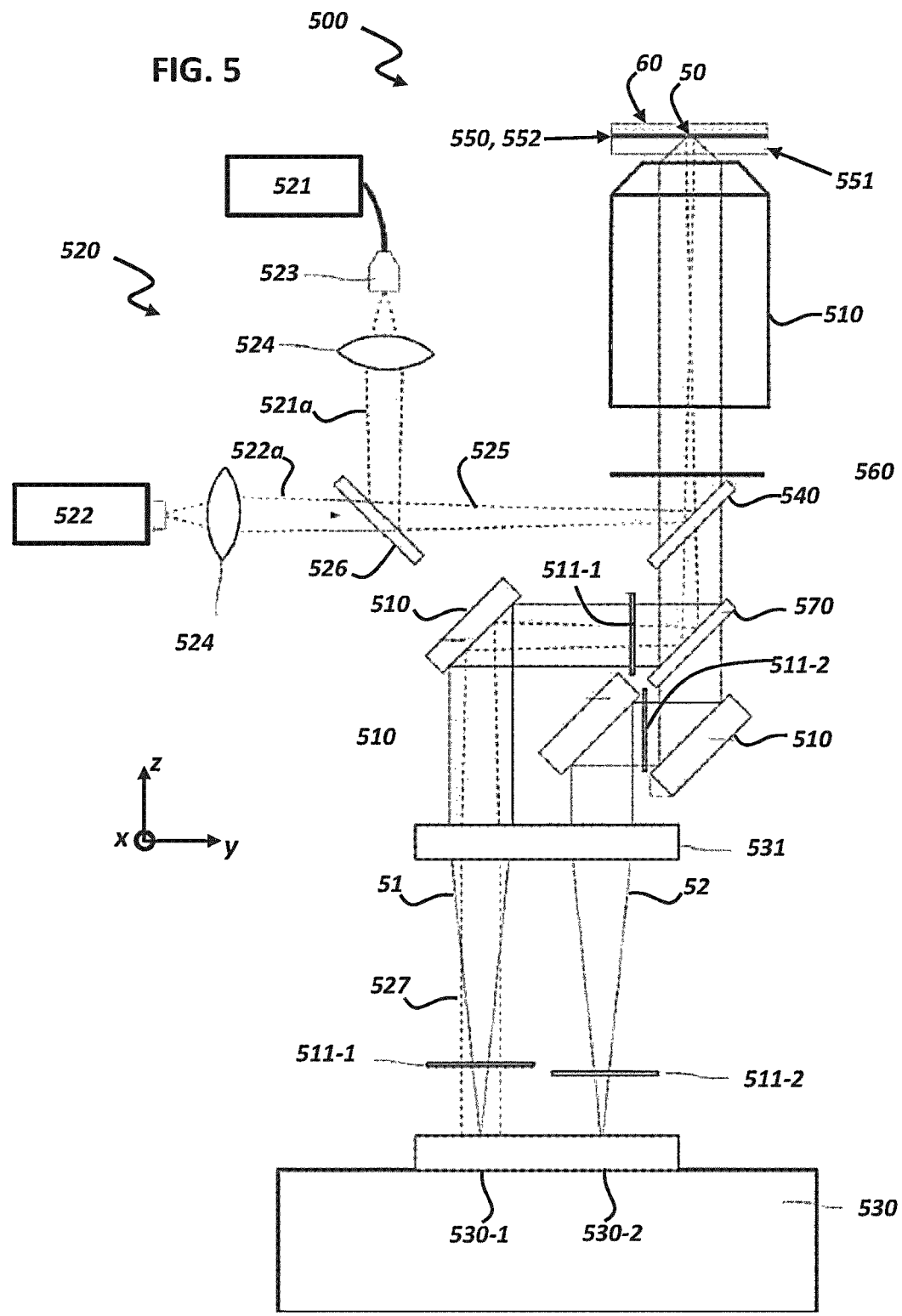
FIG. 5 is a schematic that illustrates an exemplary embodiment of an optical imaging system.

FIG. 5 is a schematic that illustrates an exemplary embodiment of an optical imaging system.

In the example of FIG. 5, the optical imaging system 500 is configured to facilitate both the iSCAT detection scheme and the fluorescence detection scheme for optical investigation of a sample 60 that includes one or more nanoscale objects 50.

The optical imaging system includes an imaging lens 510, an illumination source 520, a detector 530, and a first optical element 540.

In some implementations, the nanoscale objects 50 may include several groups of different fluorophores or nanoparticles which can be used for different detection schemes and for different excitation/detection wavelengths. For example, for the iSCAT detection scheme, the examples of the nanoscale objects 50 may include macromolecules or gold nanoparticles. For the fluorescence detection schemes, the nanoscale objects 50 may include several types of fluorophores, each with different excitation and fluorescence spectra, for example, for multi-colour fluorescence imaging. In some implementations, for a certain type of nanoparticles or fluorophores as the nanoscale objects 50, one species of the nanoscale objects 50 may be detected via both the iSCAT detection scheme and the fluorescence detection scheme. For example, a fluorescence bead, a fluorescently labelled protein or a CdSe/ZnS semiconductor quantum dot may be imaged both via the fluorescence detection scheme and the iSCAT detection scheme.

The examples of the imaging lens 510 may include a high numerical aperture (NA) oil immersion objective lens and a high numerical aperture (NA) air objective. For the discussion below, the imaging lens 510 is taken to be a high numerical aperture oil immersion objective lens, unless otherwise noted. However, other types of imaging optics can be employed for the imaging lens 510 for the optical imaging system 500.

In some implementations, the illumination source 520 may include a plurality of illumination sources arranged to provide multiple wavelengths of excitation light, to facilitate more than one detection scheme or to facilitate the use of multiple fluorophores with different colours.

In the example of FIG. 5, the illumination source 520 includes a first illumination source 521 and a second illumination source 522.

The first illumination source 521 provides a first excitation beam 521*a* for the iSCAT detection scheme. For example, the first illumination source 521 may be a laser at 450 nm wavelength used to detect the nanoscale object 50, for example, gold nanoparticles, via the iSCAT detection scheme.

In some implementations, the first excitation beam 521*a* may be linearly polarised. For example, the first excitation beam 521*a* may be launched from a polarisation maintaining fibre 523. For another example, the first illumination source 521 may output the first excitation beam 521*a* polarised from the inherent configuration of the first illumination source 521.

In some implementations, the first illumination source 521 may comprise a low-coherence light source. For example, the first illumination source 521 may comprise a compact, high-power superluminescent light emitting diode coupled to a polarisation-maintaining fibre. For another example, the first illumination source 521 may comprise a single-mode diode laser with a fast current modulation, for example, at a modulation frequency 300 MHz. As explained above, in the iSCAT detection scheme, the nanoscale object 10, 30, 50 is imaged by the optical contrast of the interference pattern between the reference light 123, 222 and the scattered light 11, 31. Therefore, the coherence length the first excitation beam 521*a* may be rendered as short as possible or the first illumination source 521 with a short coherence length may be chosen such that the interference between the scattered light 11, 31 and the spurious reflection may be mitigated in that the spurious reflection contributes to incoherent noise background, rather than a spurious interference pattern.

The second illumination source 522 provides a second excitation beam 522*a* for the fluorescence detection scheme. For example, the second illumination source 522 may be a laser with a wavelength that overlaps with an excitation spectrum or an absorption spectrum of the nanoscale object 50 within the sample 60. The nanoscale object 50 in this case may be a fluorescent tag or a fluorophore such as an organic dye molecule, a fluorescent protein, a colloidal quantum dot, or a fluorescence bead.

In some implementations, the second illumination source 522 may comprise a plurality of light sources, each capable of emitting an excitation light within a preselected wavelength band correlated with the respective excitation spectrum of a plurality of fluorescent tags or fluorophores, such that multi-colour fluorescence imaging can be performed. If the fluorescent tags or fluorophores are chosen such that each fluorophore is excited with one of the light sources within the second illumination source, a simultaneous imaging of the multiple fluorophores may be performed.

For example, the second illumination source 522 may comprise multiple light sources, each capable of emitting output light with different wavelengths, for example 405 nm, 488 nm, 561 nm and 640 nm, to facilitate the use of at least four different kinds of fluorescent tags, each excitable with one of the wavelengths.

In FIG. 5, the dotted lines represent the optical path of the excitation beams 521*a* and 522*a* and a reference light 527. The reference light 527 is part of the excitation beams 521*a*, 522*a* reflected at a sample interface 550.

The first excitation beam 521*a*, emitted from the first illumination source 521 and the second excitation beam 522*a*, emitted from the second illumination source 522 may be combined to form an excitation beam 525 before being directed into the imaging lens 510.

In the description of FIG. 5, the excitation beam 525 will be used to refer to the combination of the first excitation beam 521*a* and the second excitation beam 522*a*. The first excitation beam 521*a* and the second excitation beam 522*a* will be used to refer to the respective spectral portions of the excitation beam 525 for the iSCAT detection scheme and the fluorescence detection scheme, throughout the excitation path towards the sample 60.

In some implementations, the first excitation beam 521*a* and the second excitation beam 522*a* are combined to form the excitation beam 525 at a combining optics 526. The examples of the combining optics 526 may include a beam splitter, a polarising beam splitter and a dichroic mirror although the implementation of the combining optics 526 is not limited to these examples.

In some implementations, the combining optics 526 may be a dichroic mirror when the wavelengths of the first excitation beam 521*a* and the second excitation beam 522*a* are separated far enough to allow the use of the dichroic mirror. For another example, the combining optics 526 may be a polarisation beam splitter and the polarisation of the first excitation beam 521*a* and the second excitation beam 522*a* may be arranged such that they are combined at the output of the polarisation beam splitter. If the available optical power of the illumination source 520 is larger than the required power for the measurements such that some of the optical power may be lost at the combining optics 526, any optics capable of partially reflecting and partially transmitting can be used for the combining optics 526.

In some implementations, in case the second illumination source 522 includes a plurality of light sources, one or more of the light sources may not be operative depending on the choice of the fluorescent tags. For example, some of the light sources may be turned off or physically blocked.

In the example of FIG. 5, a wide-field illumination is used for exciting the sample 60 and the nanoscale object 50, both for the iSCAT detection scheme and the fluorescence detection scheme. In case the excitation beams 521*a*, 522*a*, 525 are substantially collimated, the excitation beams 521*a*, 522*a*, 525 may be focused onto the is back-focal plane of the imaging lens 510 using a wide-field lens 524. In the example of FIG. 5, two wide-field lenses 524 are disposed in front of the first illumination source 521 and the second illumination source 522 before the combining optics 526.

The implementation of the wide-field illumination is not limited to the configuration shown in FIG. 5. For example, a single wide-field lens 524 may be placed after the combining optics 526 for the combined excitation beam 525. Alternatively, an individual wide-field lens may be placed in front of some or all of the light sources in the second illumination source 522.

In case the excitation beams 521*a*, 522*a*, 525 are substantially collimated, in absence of the wide-field lens 524, the confocal illumination may be achieved.

The excitation beam 525 is directed into the imaging lens 510 by a first optical element 540.

The first optical element 540 may be configured to direct the excitation beam 525 into the imaging lens 510 and configured to separate at least part of the light emitted from the nanoscale object 50 from the excitation path, the path of the excitation beam 525 from the illumination source 520 to the sample 60 such that the emitted light is directed to the detector 530.

In some implementations, the excitation beam 522a emitted from the second illumination source 522 can be configured to perform the Total Internal Reflection Fluorescence (TURF) microscopy as the fluorescence detection scheme. Starting from the alignment for the wide-field illumination, the excitation beam 522a emitted from the second illumination source 522 can be displaced translationally away from the optical axis of the imaging lens 510. In other words, the optical path of the excitation beam 522a can be displaced being parallel to the optical axis of the imaging lens 510.

In FIG. 5, the optical axis or the central axis of the imaging lens 510 is along the z-axis through the centre of the cross sections in xy-plane of one or more lenses included in the imaging lens 510. Therefore, the displacement of the excitation beam 522a from the second illumination source 522 may be in any direction within the xy-plane to achieve a TURF illumination.

The displacement of the excitation beam 522a leads to an angled illumination near the sample interface 550. If the angle of the illumination of the excitation beam 522a is beyond the angle for the total internal reflection at the sample interface 550, in particular at the interface between the optical coating 552 and the sample 60, then so-called objective-based TIRF illumination or through-the-objective TIRF illumination is achieved.

Since the excitation provided by the excitation beam 522a emitted from the second illumination source 522 forms an evanescent field at the sample interface 550, the sample 50 is excited only within approximately wo nm height in z-direction from the sample interface 550. This enables fluorescence detection with reduced background counts.

The translational movement of the excitation beam 522a emitted from the second illumination source 522, may be facilitated by arranging an optical path for the excitation beam 522a, where one of the mirrors reflecting the excitation beam 522a is mounted on a translation stage. However, the way in which the excitation beam 522a is displaced within xy-plane is not limited to the use of a translation stage. As long as the excitation beam 522a can be displaced from the central axis of the imaging lens while being parallel to the central axis, any other devices or arrangements can be employed.

In the iSCAT detection scheme, the nanoscale object 50 scatters the excitation beam 525, thereby emits a scattered light 51. In the fluorescence detection scheme, the nanoscale object 50, on excitation, emits a fluorescence light 52. The optical path for the scattered light 51 and the fluorescence light 52 are represented as solid lines in FIG. 5.

In some implementations, the first optical element 540 may be configured to be a polarising beam splitter for the excitation beam 525, in particular for the first excitation beam 521a emanating from the first illumination source 521, for the iSCAT detection scheme. In this case, the first excitation beam 521a may be polarised such that the first excitation beam 521a is substantially reflected at the first optical element 540. This reduces the loss of power of the first excitation beam 521a for the iSCAT detection beam in the excitation path from the first illumination source 521 to the sample 60 via the imaging lens 510.

For the wavelength of the excitation beam 521a from the first illumination source 521, the first optical element 540 may be configured to substantially reflect light with a s-polarisation incident on the first optical element 540. For example, when the first excitation beam 521a, around 450 nm wavelength, is incident on the first optical element 540 s-polarised at 45 degrees angle-of-incidence, more than 94% of the power may be reflected at the first optical element 540 and sent into the imaging lens 510. Also, around 450 nm wavelength, the first optical element 540 may be configured to substantially transmit light with p-polarisation incident on the first optical element 540 at 45 degrees angle-of-incidence with a transmissivity higher than 0.9.

In some implementations, the optical imaging system 500 may further include a quarter wave plate 560 disposed between the first optical element 540 and the imaging lens 510 such that the first excitation beam 521a enters the imaging lens 510 after going through the quarter wave plate 560. When the first excitation beam 521a incident on the sample 60 is reflected at the sample interface 550, the reflected part of the first excitation beam 521a, the reference light 527, goes through the quarter wave plate 560 once again while it travels towards the first optical element 540.

If the optic axis of the quarter wave plate 560 is aligned with respect to the alignment of the first optical element 540, namely 45 degrees with respect to the polarisation of the first excitation beam 521a, the retardation provided by the quarter wave plate 560 results in the rotation of the polarisation of the first excitation light 521a by 90 degrees after going through the quarter wave plate 560 for the second time. In other words, the s-polarised first excitation beam 521a on the way into the imaging lens 510 becomes p-polarised when the first excitation beam 521a reaches the first optical element.

Since the reflected part of the first excitation beam 521a, the reference light 527, is p-polarised when it is incident on the first optical element 540, a substantial portion of the power, for example 90%, of the reference light 527 is transmitted at the first optical element 540 towards the detector 530.

As discussed above, as the reflectivity at the sample interface 550 is reduced, the optical power of the first excitation beam 521a may be rendered higher because the intensity of the reference light impinging on the detector 530 decreases. The first optical element 540 configured as a polarising beam splitter and the disposition of the quarter wave plate 560 between the first optical element 540 and the imaging lens 510 may prevent unnecessary loss of optical power of the excitation beam 521a, thereby facilitating the operation of the iSCAT detection scheme at an optimal operating point, in terms of the optical contrast and/or the signal-to-noise ratio.

In some implementations, in addition to being configured to be a polarising beam splitter for the wavelength band of the first excitation beam 521a, the first optical element 540 may be further configured to be a dichroic mirror for the second excitation beam 522a and the fluorescence spectrum of the fluorophore to be excited by the second excitation beam 522a. In other words, if a first fluorophore is excitable with one of the light sources of the second illumination source 522 at a first wavelength and, on excitation, emits fluorescence light at a second wavelength, the first optical element 540 may be configured to reflect at the first wavelength and transmit at the second wavelength. For example, when the fluorescence spectrum of the fluorophore comprises a distribution of wavelengths, the first optical element may be configured to transmit at least part of the fluorescence spectrum, at the second wavelength.

In some implementations, in addition to being configured to be a polarising beamsplitter for the first excitation beam 221a, the first optical element 540 may be further configured to be a dichroic mirror at each of the wavelengths of the second excitation beam 522a and the fluorescence spectra of the respective fluorophores to be excited by the plurality of light sources of the second illumination source 522.

In this case, the first optical element 540 may be referred to as a polychroic polarising mirror in that the optical element 540 acts as a polarising beam splitter for the iSCAT detection scheme and a polychroic mirror for a plurality of fluorophore for the fluorescence detection scheme.

As an example, the first optical element 540, a polychroic polarising mirror, with following specifications was custom manufactured: For the iSCAT detection scheme at a wavelength from 440 to 456 nm, angle-of-incidence: 45 degrees.
Reflectivity (s-polarisation) higher than 94% at 440-456 nm wavelength.
Transmissivity (p-polarisation) higher than 90% 440-456 nm wavelength.

For the fluorescence detection scheme at four excitation wavelengths 405 nm, 488 nm, 561 nm, 640 nm, Reflectivity (random polarisation) higher than 94% on the average over the wavelength bands of 370-410, 470-493, 555-565, 630-650 and 820-860 nm.
Transmissivity (random polarisation) higher than 90% on the average over the wavelength bands of 505-545, 575-620 and 660-800 nm.

A polychroic polarising mirror as the first optical element 540 may render the optical imaging system 500 compact while facilitating multiple detection schemes and multiple fluorophores. For example, by using the polychroic polarising mirror, the optical imaging system 500 which facilitates both the iSCAT detection scheme and the fluorescence detection scheme may be integrated into a compact microscope, such as described in US10,330,904 B2.

When the fluorescence light 52 emitted at the nanoscale object 50 and collected by the imaging lens 510 may be linearly polarised, but this may be depolarised when the fluorescence light 52 goes through the quarter wave plate 560. Since the first optical element 540 is configured to be a dichroic beam splitter for each nanoscale object 50, each fluorophore, at least a fraction of the fluorescence light 52, for example, higher than 90% of the power, may be transmitted at the first optical element 540, regardless of the polarisation of the fluorescence light 52.

In some implementations, when the optical imaging system 500 facilitates both the iSCAT detection scheme and the fluorescence detection scheme, the scattered light 51 and the fluorescence light 52 emitted by the nanoscale object 50, after being transmitted at the first optical element 540, are incident on a long pass mirror 570. The long pass mirror 570 may be configured to separate the optical path of the scattered light 51 and the fluorescence light 52. For example, with a cut-off wavelength at 620 nm, the long pass mirror 570 may be configured to transmit a light beam with a wavelength above 620 nm and reflect a light beam with a wavelength below 620 nm. If the scattered light 51 is at 450 nm, the wavelength of the first excitation beam 521a, and the fluorescence light 52 is over a spectrum of 660-710 nm, the scattered light 51 and the reference light 527 are reflected at the long pass mirror 570 and the fluorescence light 52 is transmitted at the long pass mirror 570.

In some implementations, the scattered light 51, the reference light 527, and the fluorescence light 52 may be directed to one multi-array detector 530. In particular, the iSCAT detection and the fluorescence detection may be performed on a different parts of the light-sensitive area of the same detector 530. For example, the scattered light 51 and the reference light 527 may be directed to impinge on a first part 530-1 of the light-sensitive area of a multi-pixel detector 530, such as a CMOS camera or a CCD camera and the fluorescence light 52 may be directed to impinge on a second part 530-2 of the light-sensitive area of the multi-pixel detector 530.

Therefore, the nanoscale objects 50 of the sample 60 near the sample interface 550 may be imaged at one and the same detector 530 both via the interference pattern for the iSCAT detection scheme formed by the scattered light 51 and the reference light 527 and via the fluorescence light 52 for the fluorescence detection scheme.

Once the reflectivity at the sample interface 550 is adjusted to improve the optical contrast by configuring the optical coating 552 accordingly, the optical power of the reference light 527 may also be rendered within the saturation intensity of the detector 530 suitable for the fluorescence detection scheme. Therefore, the detector 530 may be used both for the iSCAT detection scheme and the fluorescence detection scheme.

Simultaneous imaging via the iSCAT detection scheme and the fluorescence detection scheme using different parts of one and the same detector 530 has advantages that it is ensured that both images are simultaneously in focus and thus results in an inherently robust and compact apparatus.

In some implementations, in order to image the focal plane of the imaging lens 510 at the detector 530, the detector 530 may further comprise further optics such as a tube lens 531.

In some implementations, the optical imaging system 500 may further include mirror 510 at appropriate places, to guide the light rays.

In some implementations, the optical imaging system 500 may include optical filters 511 after the long pass optical mirror, in the separated detection paths for the iSCAT detection scheme and the fluorescence detection scheme. For example, in the optical path for the fluorescence transmitted from the long pass optical mirror 570, the optical filter 511-1 may be configured to pass fluorescence light 52, for example, in the wavelength range of 660-710 nm. For another example, in the optical path for the iSCAT detection reflected from the long pass optical mirror 570, the optical filter 511-2 may be configured to be a bandpass filter around the wavelength of the first excitation beam 521a, the scattered light 51, and the reference light 527, for example around 450 nm.

In some implementations, the optical filter 511-1 placed in the optical path for the iSCAT detection may be used for the fluorescence detection scheme when the first illumination source 521 is turned off or blocked such that the iSCAT detection scheme is disabled. In this case, the optical imaging system 500 is used as a two-channel fluorescence microscope.

For example, the optical filter 511-1 in the optical path for the iSCAT detection scheme may transmit around 450 nm, 500 to 550 nm and 570 to 620 nm. The optical filter 511-2 in the optical path for the fluorescence detection scheme may transmit around 660 to 710 nm.

The optical imaging system 500 configured to facilitate both the iSCAT and the fluorescence detection schemes provide correlative measurements between the two detection schemes. The optical imaging system 500 does not compromise the point-spread function of the microscope and is compatible with high-precision localisation fluorescence imaging.

While the iSCAT microscopy is capable of detecting and weighing unlabeled, single molecules and facilitates the study of molecular assembly properties, the scope of applications may be increased by combining iSCAT with a super-resolution, single molecule fluorescence microscopy. Therefore, the correlative setup shown in FIG. 5 may vastly increase the scope of application, in addition to providing a compact and efficient setup.

Figure 6A:
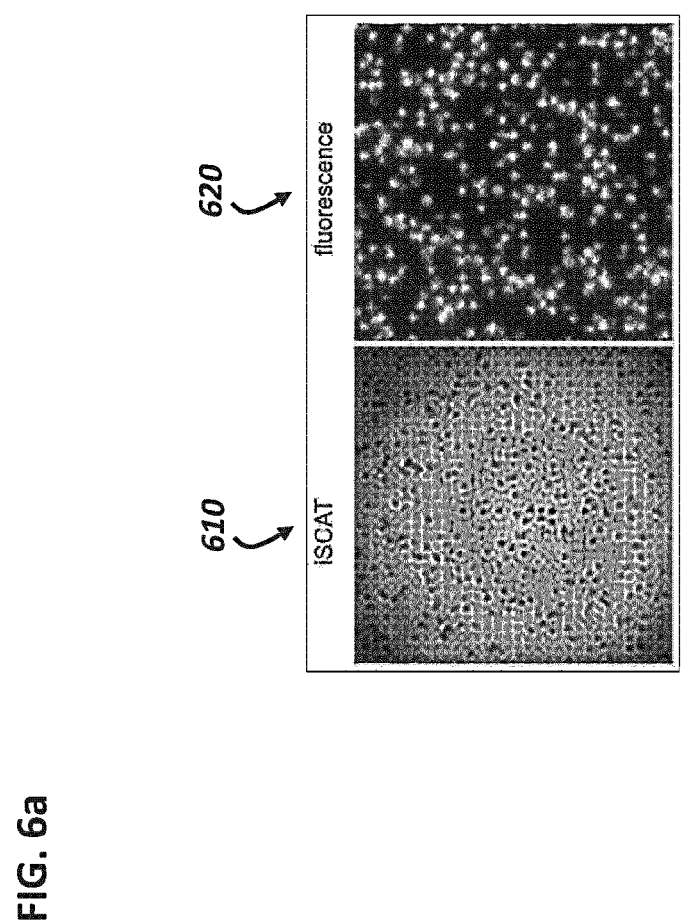
FIG. 6a show measurement results obtained simultaneously obtained using the iSCAT and fluorescence detection schemes.

FIG. 6a show measurement results obtained simultaneously obtained using the iSCAT and fluorescence detection schemes.

The experimental results shown in FIG. 6a were obtained using the optical imaging system 500 described in FIG. 5 with the specifications provided in FIGS. 4a and 4b. However, unlike FIGS. 4a and 4b, FIG. 6a shows a raw data without further data processing.

The nanoscale objects 50 were fluorescent beads with 100 nm diameter. The fluorescence beads can be detected via both the iSCAT detection scheme and the fluorescence detection scheme.

A left panel 610 of FIG. 6a shows an image taken with the iSCAT detection scheme. A right panel 620 of FIG. 6a shows an image taken with the fluorescence detection scheme.

The images shown in the left panel 610 and the right panel 620 were taken simultaneously with one and the same camera, which is a scientific complementary metal-oxide-semiconductor (CMOS) camera.

These results suggest that the optical coating 552 is compatible with a high resolution fluorescence imaging in that the point spread function is not distorted in the fluorescence detection scheme. This may be in contrast to other methods that employ spatial filtering to enhance the optical contrast, which may affect the point spread function of the optical imaging system.

Figure 6B:
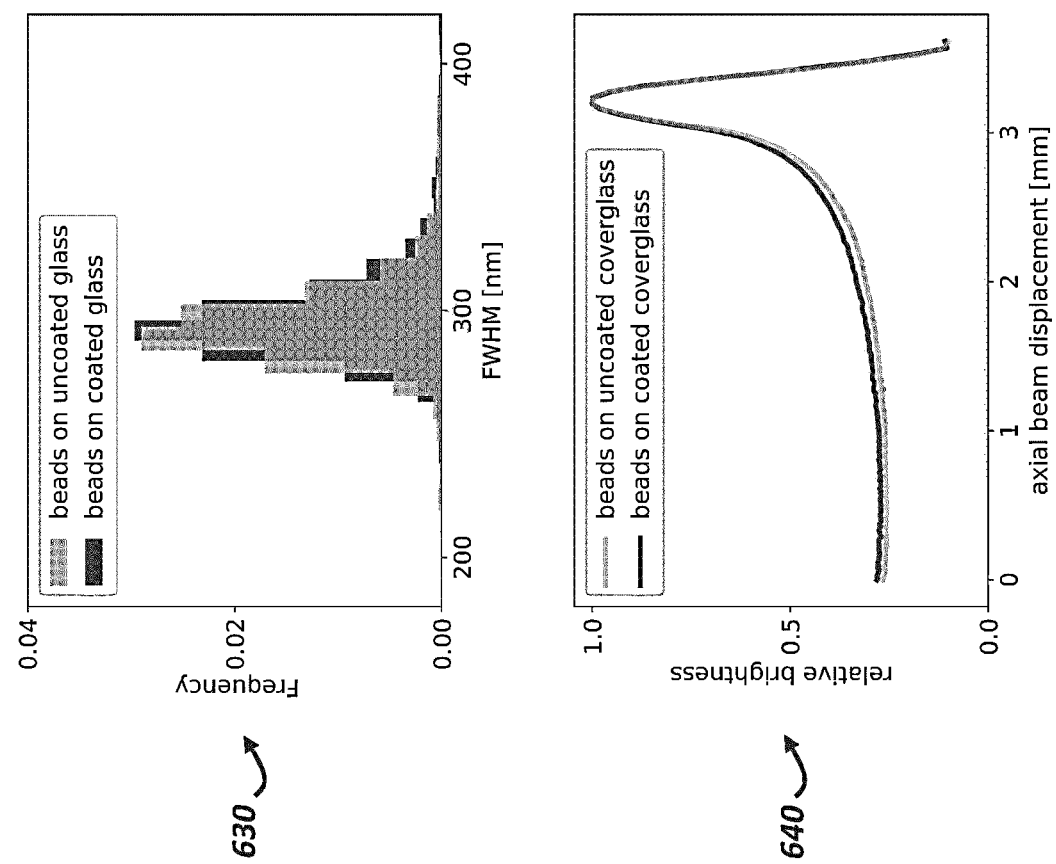
FIG. 6b show measurement results for investigating the effect of the optical coating on the fluorescence imaging.

FIG. 6b show measurement results for investigating the effect of the optical coating on the fluorescence imaging.

In order to further investigate the effect of the optical coating 522 on the collection efficiency and the point spread function of the fluorescence detection scheme, fluorescence beads were measured with the optical imaging system 500 with and without the optical coating 522 on the substrate 521. The fluorescence beads with 100 nm diameter were measured.

The wavelength of the excitation beam 522a from the second illumination source 522 was 640 nm. The fluorescence light emitted from the beads was filtered and the emission between 665 nm to 705 nm was collected. 4600 fluorescence beads from four different samples made with uncoated glass coverslips and 3500 beads from five different samples made with coated coverslips were measured via the fluorescence detection scheme using the wide-field illumination. The imaging lens 510 used was 1.4 NA oil objective lens.

An upper panel 630 shows a histogram of the full-width half-maximum (FWHM) obtained by fitting a Gaussian curve to the acquired images of individual fluorescence beads. The two distributions of the FWHM for the measurements made on the coated glass coverslip and the uncoated coverslip largely overlap with each other. This suggests that the optical coating 552 does not significantly distort the point spread function obtained by fluorescence imaging.

A lower panel 640 shows the measurements of mean brightness of the fluorescence beads as a function of the lateral displacement of the excitation beam 552a emitted from the second illumination source 552 in the xy-plane. The brightness of each bead was obtained from the peak height of the Gaussian fit. The position for 0 axial beam displacement represents the excitation beam 552a incident on the sample interface 550 through the optical axis of the imaging lens 510 with 0 degrees AOI. As explained above, as the axial beam displacement increases, the AOI increases accordingly, leading to an angled incidence of the wide-field illumination. At around 3 mm of the axial beam displacement, the relative brightness peaks, which suggests that the TIRF condition is met. For larger displacements, part of the excitation beam 552a is blocked by the aperture of the imaging lens 510. The maximum angle supported by the imaging lens 510, 1.4 NA oil objective lens, is around 69 degrees and the angle at which the TIR condition is met is around 61 degrees.

The data in the lower panel shows that the curves representing the relative brightness as a function of the axial beam displacement for the fluorescence beads on coated cover glass and on uncoated cover glass largely coincide with each other. The height of each curve was rescaled such that the maximum value corresponds to the relative brightness of 1. The maximum brightness of the uncoated coverslip was larger than that of the coated coverslip by 17%. These data suggest that the TIRF angle and the intensity of the excitation beam 522 a of the second illumination source 522 are not affected significantly by the coating.

Figure 7:
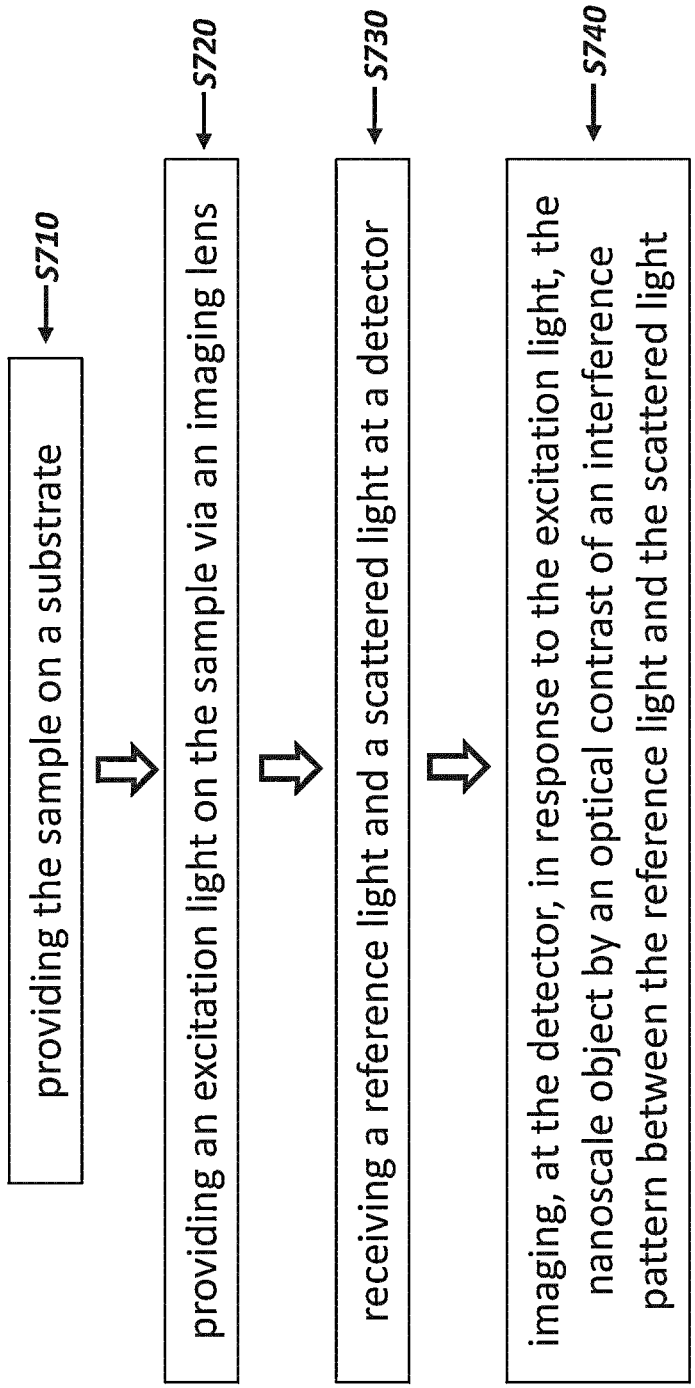
FIG. 7 shows a flowchart illustrating the method of performing an interferometric scattering microscopy.

FIG. 7 shows a flowchart illustrating the method of performing an interferometric scattering microscopy.

At step 710, a sample 20, 40, 60 is provided on a substrate 251, 551. When the sample 20, 40, 60 comprises an aqueous solution, the aqueous solution may be applied to the substrate 251, 551.

At step 720, an excitation light is provided on the sample 20, 40, 60 via an imaging lens 110, 210, 510. A sample interface 150, 250, 350, 550 arranged to reflect the excitation light 121, 122, 221, 521a, 522a may be formed between the sample 20, 40, 60 and a first side 252-1 of the substrate facing the sample when the sample is applied on the substrate 251, 551.

At step 730, a reference light 123, 222, 527 and a scattered light 11, 31, 51 are received at a detector 130, 230, 530. The reference light 123, 222, 527 comprises a part of the excitation light 121, 122, 221, 521a, 522a reflected at the sample interface 150, 250, 350, 550 and collected by the imaging lens 110, 210, 510 and the scattered light 11, 31, 51 comprises a part of the excitation light 121, 122, 221, 521a, 522a scattered by the nanoscale object 10, 30, 50 and collected by the imaging lens 110, 210, 510.

At step 740, the nanoscale object 110, 210, 510 is imaged at the detector 130, 230, 530 in response to the excitation light 121, 122, 221, 521a, 522a by an optical contrast of an interference pattern between the reference light 123, 222, 527 and the scattered light 11, 31, 51. The substrate 251, 551 may comprise an optical coating 252, 300, 552 disposed on the first side 252-1 of the substrate such that the sample 20, 40, 60 is in contact with the optical coating when the sample is applied to the substrate 251, 551. A degree of reflection of the excitation light 121, 122, 221, 521a, 522a at the sample interface 150, 250, 350, 550 is such that the optical contrast is larger compared to the optical contrast obtained with the sample interface formed without the optical coating 252, 300, 552.

Figure 8:
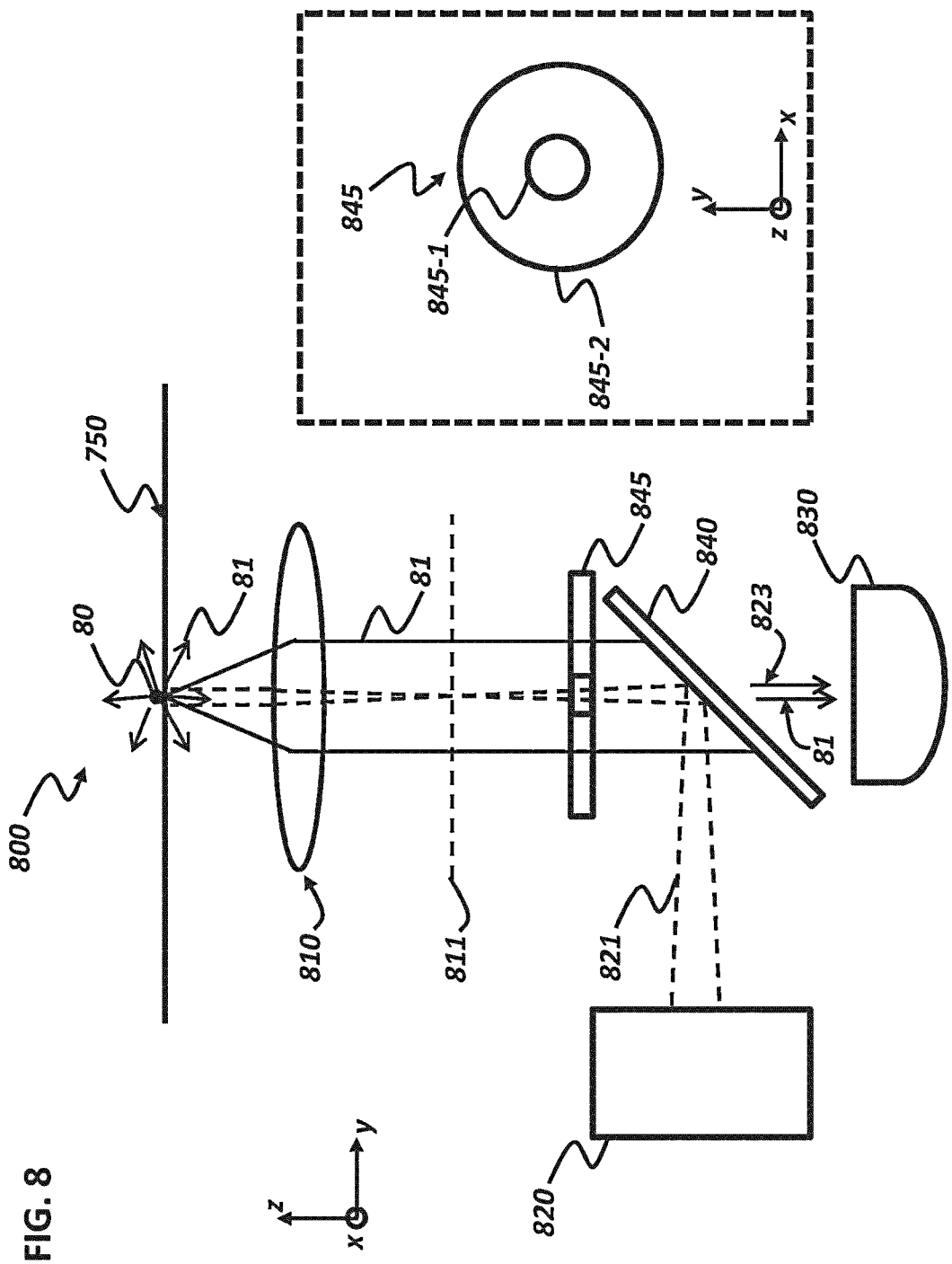
FIG. 8 is a schematic that illustrates an exemplary embodiment of an optical imaging system.

FIG. 8 is a schematic that illustrates an exemplary embodiment of an optical imaging system.

The optical imaging system Boo includes an imaging lens 810, an illumination source 820, a detector 830, an optical element 840. The optical imaging system Boo may be configured for the iSCAT detection and the fluorescence detection of a nanoscale object 80, as discussed in either FIG. 1 or FIG. 2a.

In the embodiment of the optical imaging system 800 described in FIG. 8, the optical element 840 comprises a polarisation beam splitter and the optical imaging system 800 further comprises a structured waveplate 845.

In the example of FIG. 8, the optical imaging system 800 is configured as an iSCAT microscope and the illumination source 820 is configured such that an excitation beam 821 or an excitation light 821 creates a wide-field illumination at a sample interface 850 by focusing the excitation beam 821 at a back-focal plane 811 of the imaging lens 810.

The structured waveplate 845 is disposed between the optical element 840 or the polarisation beam splitter 840 and the imaging lens 810. For example, in case the imaging lens 810 comprises an objective lens, the structured waveplate 845 can be disposed between the aperture of the objective lens 810 and the polarisation beam splitter 840.

Before reaching the imaging lens 810, the excitation beam 821 is reflected at the polarisation beam splitter 840, in which case only the s-polarisation component of the excitation beam 821 is sent into the imaging lens. In the example of FIG. 8, the polarisation component of the excitation beam 821 in the x-direction is reflected at the polarisation beam splitter 840 and directed to the imaging lens 810 via the structured waveplate 845, and the polarisation component of the excitation beam 821 in the y-direction is transmitted at the polarisation beam splitter 840.

The structured waveplate 845 comprises an inner region 845-1 and an outer region 845-2, as illustrated in the right panel of FIG. 8.

The inner region 845-1 comprises a waveplate which introduces a retardation at the wavelength of the excitation beam 821. The inner region 845-1 introduces a retardation to a polarisation component of the excitation beam 821 parallel to an optic axis or a fast axis of the waveplate.

The structured waveplate 845 is disposed within the optical imaging system 800 such that the optic axis of the waveplate of the inner region 845-1 lies on the plane substantially perpendicular to the propagation of the excitation beam 821. In the example of FIG. 8, the structured waveplate 845 is positioned parallel to the xy-plane and the optic axis of the inner region 845-1 is on the xy-plane.

The structured waveplate 845 is disposed within the optical imaging system 800 such that a substantial portion of the excitation beam 821 passes through the inner region 845-1. The area of the inner region 845-1 is arranged to be larger than the cross section of the excitation beam 821 at the position of the structured waveplate 845.

In the example of FIG. 8, the excitation beam 221, after being reflected at the polarisation beam splitter 840, polarised in x-direction, passes through the inner region 845-1 and is directed to the imaging lens 810. The structured waveplate 845 may be disposed such that the optic axis of the inner region 845-1 can be rotated to a desired angle. For example, the optic axis of the inner region 845-1 may be positioned at 45 degrees from the x-axis.

As explained in FIGS. 1 and 2a, the excitation beam 221 is partially reflected at the sample interface 850 and reflected towards to detector 830. The reflected portion of the excitation beam 821 passes again through the inner region 845-1 of the structured waveplate 845 and the polarisation beam splitter 840 before reaching the detector 830. The portion of the excitation beam 221 which passes the polarisation beam splitter 840 and is directed to the detector 830 serves as a reference light 823 of the iSCAT detection scheme and interferes with the scattered light 81.

A substantial portion of the scattered light 81 collected by the imaging lens 810 is passes through the outer region 845-2. The outer region 845-2 of the structured waveplate 845 comprises a substrate with a different degree of retardation to the inner region 845-1.

In some implementations, the outer region 845-2 comprises a transparent substrate, which is optically transparent at the wavelength of the excitation beam 821 and to the scattered beam 81. For example, the outer region 845-2 may comprise a standard glass such as fused silica.

The area of the structured waveplate 845 is arranged to be larger than the cross section of the collected light from the imaging lens 810.

For example, in case the imaging lens 810 is an infinity corrected objective lens as depicted in the example of FIG. 8, the collected scattered light 81 which exits the aperture of the objective lens 810 forms a substantially collimated beam with a cross section area comparable to the size of the aperture. The area of the structured waveplate 845 can be arranged to be comparable or larger than the area of the aperture of the imaging lens 810.

As stated above, the area of the inner region 845-1 is arranged to be larger than that of the cross section of the excitation beam 821 at the position of the structure waveplate 845. The area of the inner region 845-1 is also arranged to be substantially smaller than the area of the structured waveplate 845 such that only a small fraction of the scattered light 81 passes the inner region 845-1.

For example, when the diameter of the clear aperture of the objective lens 810 is 9 mm, and the diameter of the excitation beam 821 is 200 microns at the position of the structured waveplate 450, the diameter of the inner region 845-1 can be set to be 400 microns and the diameter of the outer region 845-2 can be set to be 9 mm or larger. In this case, the area of the inner region 845-1 is less than 0.2% of the total area. Only the fraction of the scattered light 81 falling within the area of the inner region 845-1 experiences retardation by the waveplate of the inner region 845-1.

Jones matrix formalism can be used to estimate the relative intensity of the scattered light 81 and the reference light 823 at the detector 830. The excitation beam 821, after being reflected at the polarisation beam splitter 840 before being incident on the structured waveplate 845 can be described by a two-component vector:

$$p_{in} = \begin{bmatrix} 1 \\ 0 \end{bmatrix} \qquad \text{Equation 10}$$

In the example of FIG. 8, the excitation beam 821 is polarised in the x-direction and the bases of the two-component vector $p_{in}$ are unit vectors in the x-direction and the y-direction.

The action of the waveplate 845-1 of the structured waveplate 845 is determined is by two parameters, the angle θ of the fast axis or the optic axis with respect to the polarisation direction of $p_{in}$, in the example of FIG. 8, x-direction, and the induced retardation η. The polarisation state of the excitation light 821 after passing the structured waveplate 845 is given by matrix multiplication of the Jones matrix J(θ,η) and the input vector $p_{in}$.

$$J(\theta, \eta) = e^{-i\eta/2} \begin{bmatrix} \cos(\theta)^2 + e^{i\eta/2}\sin(\theta)^2 & (1 - e^{i\eta})\cos(\theta)\sin(\theta) \\ (1 - e^{i\eta})\cos(\theta)\sin(\theta) & \sin(\theta)^2 + e^{i\eta/2}\cos(\theta)^2 \end{bmatrix} \qquad \text{Equation 11}$$

On the approximation that the scattered light 81 has the same polarisation as the excitation beam 821, and that the scattered light 81 is not affected by the waveplate 845-1 as explained above, the polarisation state of the scattered light 81 at the polarisation beam splitter 840 is also given by $$p_{sc} = J(\theta, \eta) p_{in}$$ Equation 12

The intensity of the component which passes through the polarisation beam splitter 840, in the example of FIG. 8, the y-component, is, $$I_{sc} = [2 \sin(\eta/2)\cos(\theta)\sin(\theta)]^2$$ Equation 13

The reference light 823 is part of the illumination beam 821 that is reflected at the polarisation beam splitter 840, passes through the structured waveplate 845, is reflected at the sample interface 850, passes through the structured waveplate 845 and is transmitted through the polarisation beam splitter 840, in that order. The intensity of the reference light 823 is $$I_{ref} = [2\cos(\eta/2)]^2 \times [2\sin(\eta/2)\cos(\theta)\sin(\theta)]^2 = 2I_{sc} \times [1 + \cos(\eta)]$$ Equation 14

As discussed in equations 2 and 4, the optical contrast of the iSCAT detection scheme is the relative change of intensity due to the present of an object.

$$C = \frac{I_{ob} - I_{ref}}{I_{ref}} \propto \sqrt{\frac{I_{sc}}{I_{ref}}}$$ Equation 15

Thus with the structured waveplate 845, the optical contrast depends on the retardation η. The waveplate 845-1 alters the optical contrast by a factor $$C_{wp} = \sqrt{\frac{1}{2 + 2\cos(\eta)}}$$ Equation 16

For example, for a retardation η of 0.9 the contrast is enhanced by a factor 3.2.

As the contrast enhancement only depends on the retardation η and not on the angle θ of the fast axis, the signal-to-noise ratio can be optimized by maximising the intensity of the reference light 823. The maximum intensity of the reference light 823 is obtained at θ=45 degrees.

Figure 9A:
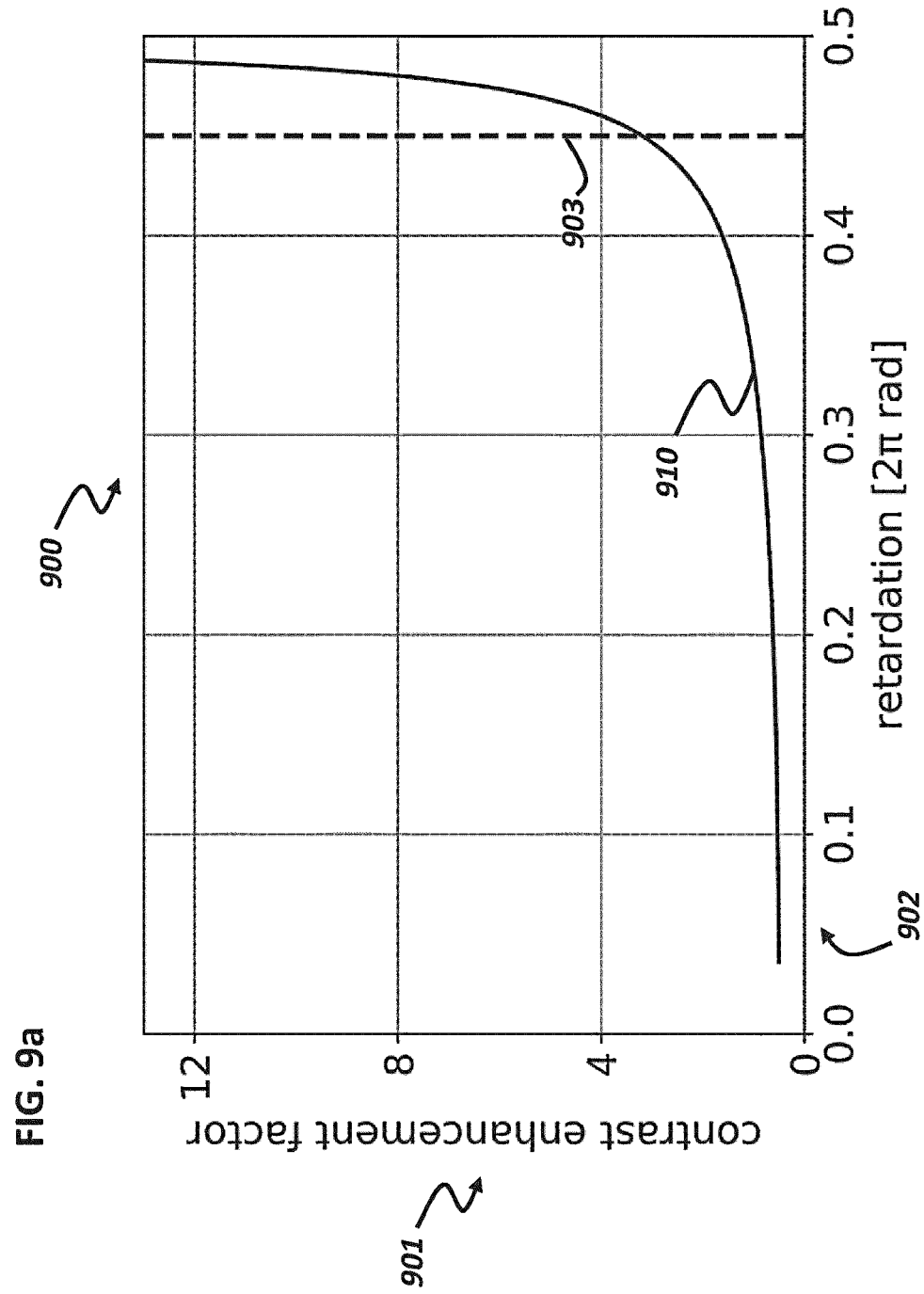
FIG. 9a is a graph that shows the optical contrast enhancement of the iSCAT detection scheme using a structured waveplate.

FIG. 9a is a graph that shows the optical contrast enhancement of the iSCAT detection scheme using a structured waveplate.

A curve 910 shown in the graph 900 shows the optical contrast given in Equation 16 as a function of the retardation. A vertical axis 901 represents a contrast enhancement factor. A horizontal axis 902 represents a retardation given by the inner region 845-1 of the structured waveplate 845. The horizontal axis 902 is in the unit of 2π.

At a retardation of 0.9π(θ=45 degrees), marked by a vertical dashed line 903 in the graph 900, the optical contrast is enhanced by a factor 3.1.

Figure 9B:
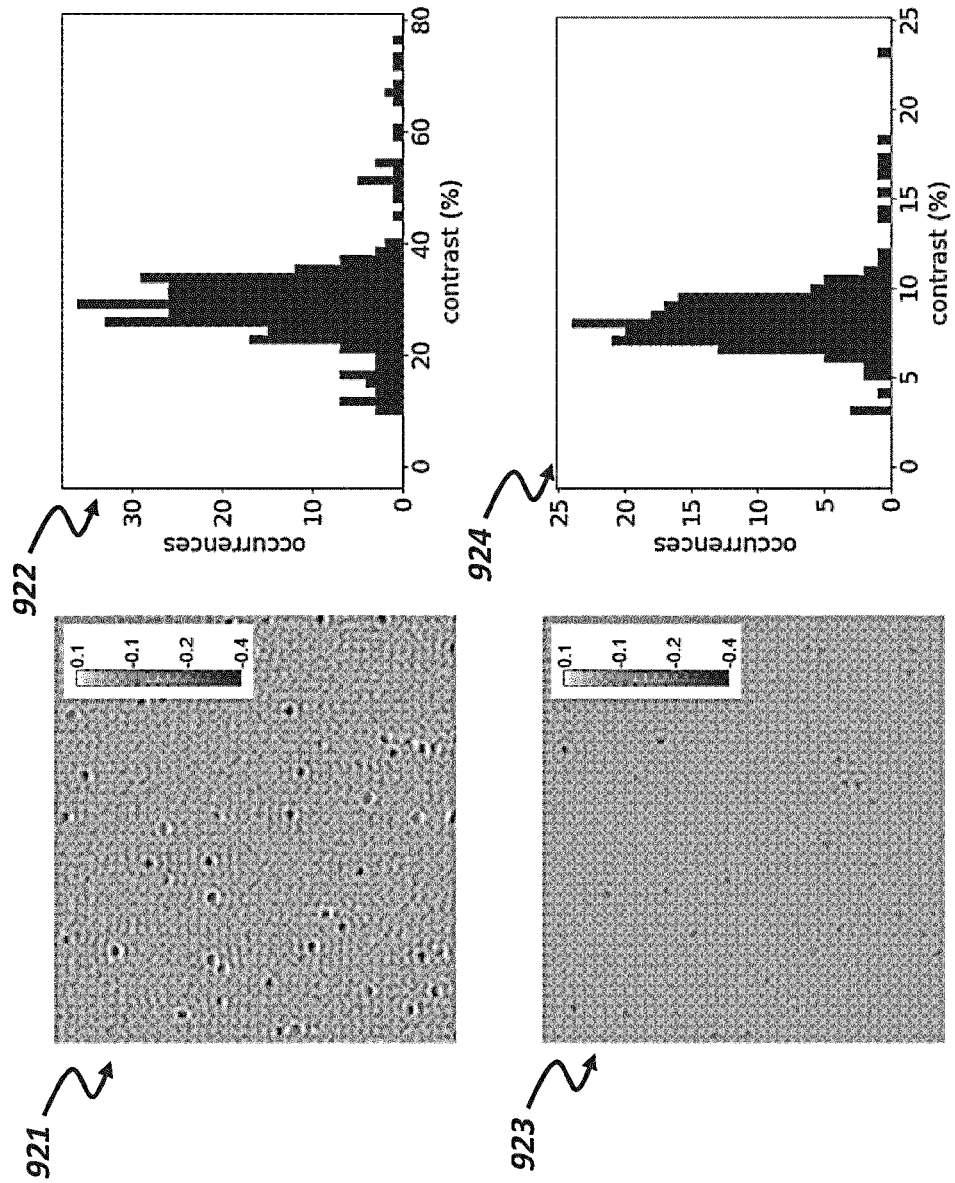
FIG. 9b shows comparison of the measurement results of the optical contrast obtained with and without the structured waveplate.

FIG. 9b shows comparison of the measurement results of the optical contrast obtained with and without the structured waveplate.

A upper left panel 921 and a lower left panel 923 of FIG. 9b show images obtained for gold nanoparticles with a nominal mean diameter of 20 nm as the nanoscale objects 80 on an uncoated coverslip. Both images 921, 923, an average of 100 frames, comprise 256×240 pixels and correspond to 15 micron×14 micron area on the sample interface 150, 250, 850. An upper right panel 922 and lower right panel 924 of FIG. 9b show histograms constructed from the measurements of the optical contrasts obtained from gold nanoparticles with a nominal mean diameter of 20 nm.

The image in the upper left panel 921 and the histogram in the upper right panel 922 were obtained using the optical imaging system 800 containing the structured waveplate 845 described in FIG. 8. The histogram was constructed from the measurements of 291 nanoparticles. A custom waveplate has been manufactured for the structured waveplate 845. The outer region 845-2, a fused silica substrate, had a diameter of 12.7 mm. The inner region 845-1 was formed by irradiating the fused silica substrate with femtosecond laser light. Alternatively, in some implementations, inner region 845-1 may comprise a small birefringent substrate such as quarts and can be disposed on a larger non-birefringent substrate as the outer region 845-2. The retardation of the waveplate of the inner region 845-1 was approximately 0.9π at 450 nm wavelength.

The image in the lower left panel 923 and the histogram in the lower right panel 924 were obtained using the optical imaging system 100, 200 without the structured waveplate 845, but with a standard quarter wave plate in place of the structure waveplate 845. The histogram was constructed from the measurements of 165 nanoparticles.

In both cases, the imaging lens 110, 210, 810 used was a high numerical is aperture oil immersion objective lens with NA=1.40 and a magnification of 111.

The measurement result shows that when the structured waveplate 845 is used, the median of the optical contrast is 29% while when the structured waveplate 845 is not used, the median of the optical contrast is 8%. This is in line with the optical contrast enhancement estimated by Equation 16.

Figure 9C:
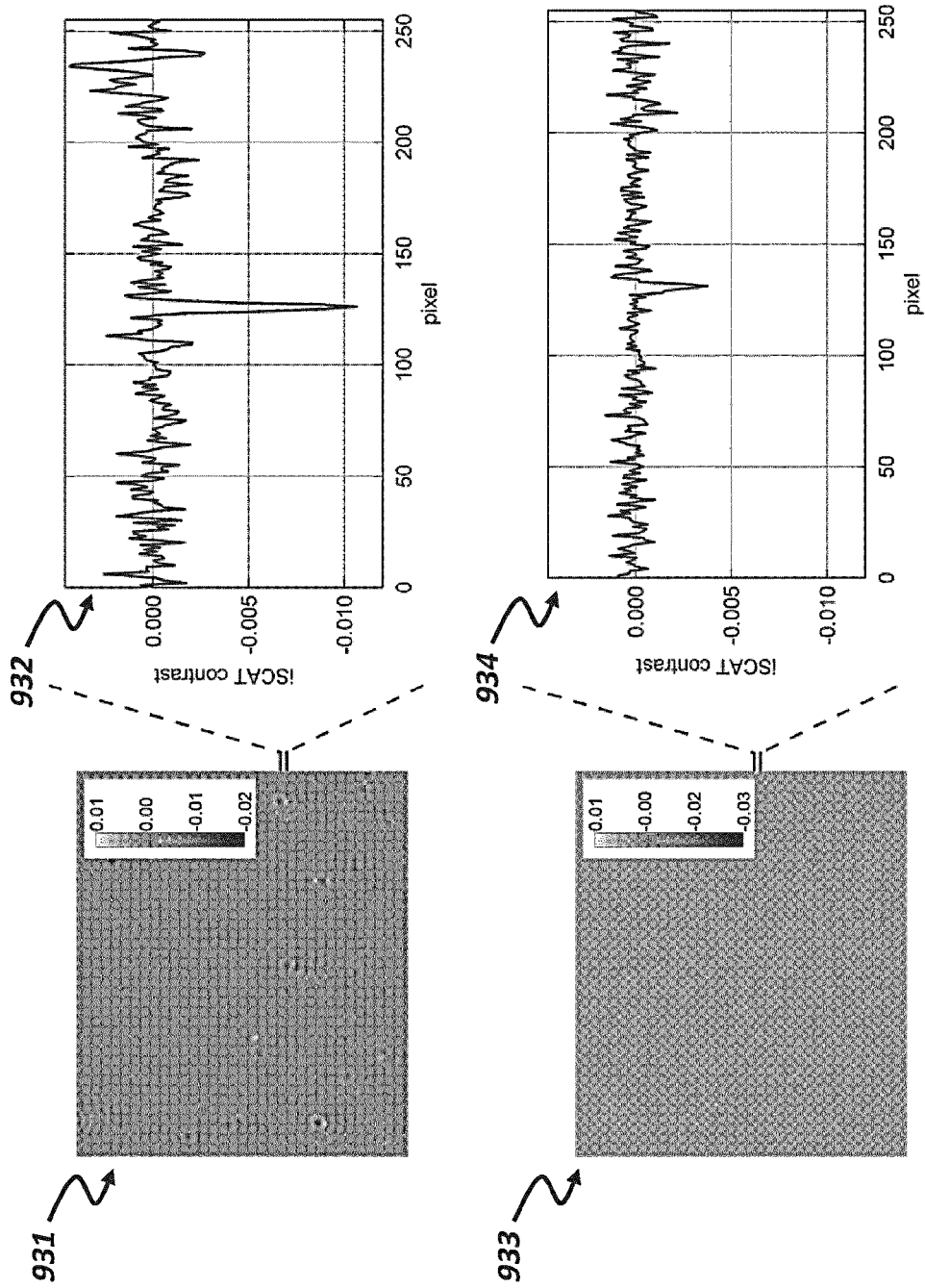
FIG. 9c show measurement results obtained using the iSCAT detection scheme with and without a structured waveplate.

FIG. 9c show measurement results obtained using the iSCAT detection scheme with and without a structured waveplate.

The nanoscale objects 80 are gold nanoparticles with a nominal mean diameter of 5 nm. Images were recorded an uncoated glass coverslip comprise 256×220 pixels, corresponding to 15 μm×13 μm on the sample interface 150, 250, 850.

The experimental results shown in upper panels 931, 932 were obtained using the optical imaging system 800 described in FIG. 8 using a structured waveplate 845.

The experimental results shown in lower panels 933, 934 were obtained using the optical imaging system 100, 200 without the structured waveplate 845, but with a standard quarter wave plate in place of the structure waveplate 845.

In both cases, the imaging lens 110, 210, 810 used was a high numerical aperture oil immersion objective lens with NA=1.40 and a magnification of in.

The images 931, 932 are an average of 400 frames, each taken with 500 frames per second integration time.

The measurement result shows that when the structured waveplate 845 is used, the optical contrast is 1.1% while when the structured waveplate 845 is not used, the optical contrast is 0.38%.

The embodiments of the invention shown in the drawings and described hereinbefore are exemplary embodiments only and are not intended to limit the scope of the invention, which is defined by the claims hereafter. It is intended that any combination of non-mutually exclusive features described herein are within the scope of the present invention.

The invention claimed is:

1. An optical system for optically imaging a sample including a nanoscale object comprising:
   an imaging lens;
   an illumination source configured to provide an excitation light;
   a detector; and
   a substrate for supporting the sample,
   wherein a sample interface, arranged to reflect the excitation light, is formed between the sample and a first side of the substrate facing the sample when the sample is applied on the substrate,
   wherein the optical imaging system is arranged such that the excitation light is sent into the substrate via the imaging lens and such that the detector receives a reference light and a scattered light,
   wherein the reference light comprises a part of the excitation light reflected at the sample interface and collected by the imaging lens and the scattered light comprises a part of the excitation light scattered by the nanoscale object and collected by the imaging lens,
   wherein the optical system is configured such that the nanoscale object is imaged at the detector, in response to the excitation light, by an optical contrast of an interference pattern between the reference light and the scattered light,
   wherein the substrate comprises an optical coating disposed on the first side of the substrate such that the sample is in contact with the optical coating when the sample is applied on the substrate, and
   wherein a degree of reflection of the excitation light at the sample interface is such that the optical contrast is larger compared to the optical contrast obtained with the sample interface formed without the optical coating.

2. The optical system of claim 1, further comprising:
   a first optical element configured to separate a path for the excitation light into the imaging lens and a path for the reference light and the scattered light into the detector.

3. The optical system of claim 2,
   wherein the first optical element is configured to be a polarising beam splitter.

4. The optical system of claim 3, further comprising a structured waveplate between the first optical element and the imaging lens,
   wherein the structured waveplate comprises an inner region configured to impart a first retardation to the excitation light and an outer region configured to impart a second retardation to the excitation light.

5. The optical system of claim 4,
   wherein a difference between the first retardation and the second retardation is between $0.7\pi$ and $0.99\pi$.

6. The optical system of claim 4,
   wherein the second retardation is zero.

7. The optical system of claim 4,
   wherein an area of the inner region is less than 4 mm$^2$.

8. The optical system of claim 3,
   wherein the optical system further comprises a quarter wave plate between the first optical element and the imaging lens, and
   wherein the excitation light is s-polarised with respect to an alignment of the polarising beam splitter such that the excitation light is substantially reflected at the first optical element into the imaging lens.

9. The optical system of claim 3,
   wherein the illumination source comprises a first illumination source and a second illumination source,
   wherein the first illumination source provides a first excitation light at a wavelength within a first wavelength band, the first excitation light being the excitation light for the reference light and the scattered light,
   wherein the second illumination source provides a second excitation light at a wavelength within a second wavelength band for a fluorescence excitation of the nanoscale object, and
   wherein the first optical element is further configured to combine the second excitation light with the first excitation light into the imaging lens and to transmit a fluorescence light into the detector such that the nanoscale object is further imaged at the detector by the fluorescence light emitted by the nanoscale object.

10. The optical system of claim 9,
    wherein the nanoscale object comprises a plurality of groups of fluorophores, each group having a different excitation spectrum, and
    wherein the second illumination source is configured to provide the second excitation light at a plurality of wavelengths for fluorescence excitation of the respective groups.

11. The optical system of claim 9,
    wherein the first illumination source comprises a superluminescence light emitting diode or a single mode diode laser with a fast current modulation.

12. The optical system of claim 9,
    wherein the optical system is configured such that the interference pattern and the fluorescence light are received simultaneously on separate parts of a light-sensitive area of the detector.

13. The optical system of claim 1,
    wherein an angle of incidence of the excitation light is arranged such that a degree of spurious reflection of the excitation light into the detector is reduced.

14. The optical system of claim 1,
    wherein the optical coating is configured such that the degree of reflection of the excitation light at the sample interface matches a degree of spurious reflection of the excitation light, wherein the spurious reflection corresponds to part the excitation light which is reflected at the interfaces formed within the optical system other than the sample interface and subsequently is detected at the detector.

15. The optical system of claim 1,
    wherein the optical coating is configured such that the degree of reflection of the excitation light at the sample interface is higher than a degree of spurious reflection of the excitation light at the interfaces formed within the optical system other than the sample interface and lower than the degree of reflection of the excitation light at the sample interface formed without the optical coating.

16. The optical system of claim 1,
    wherein the optical coating comprises:
    an intermediate layer on the first side of the substrate; and
    an external layer on the intermediate layer, arranged to receive the sample when the sample is applied on the substrate.

17. The optical system of claim 16,
    wherein the intermediate layer comprises one or more of aluminium oxide, $Al_2O_3$, hafnium dioxide, $HfO_2$, tantalum pentoxide, $Ta_2O_5$, niobium pentoxide, $Nb_2O_5$, titanium dioxide, $TiO_2$, and silicon dioxide, $SiO_2$.

18. The optical system of claim 16,
    wherein the intermediate layer comprises a transparent conducting oxide.

19. The optical system of claim 16,
wherein the external layer comprises silicon dioxide, $SiO_2$.

20. The optical system of claim 16,
wherein a thickness of the intermediate layer is between 1 and 20 nm, and a thickness of the external layer is between 80 and 200 nm.

21. The optical system of claim 1,
wherein a refractive index of the optical coating is larger than a refractive index of the sample.

22. A method of optically detecting a sample including a nanoscale object using an optical system, the method comprising:
providing the sample on a substrate;
providing an excitation light on the sample via an imaging lens,
wherein a sample interface, arranged to reflect the excitation light, is formed between the sample and a first side of the substrate facing the sample when the sample is applied on the substrate;
receiving a reference light and a scattered light at a detector,
wherein the reference light comprises a part of the excitation light reflected at the sample interface and collected by the imaging lens and the scattered light comprises a part of the excitation light scattered by the nanoscale object and collected by the imaging lens; and
imaging, at the detector, in response to the excitation light, the nanoscale object by an optical contrast of an interference pattern between the reference light and the scattered light,
wherein the substrate comprises an optical coating disposed on the first side of the substrate such that the sample is in contact with the optical coating when the sample is applied to the substrate, and
wherein a degree of reflection of the excitation light at the sample interface is such that the optical contrast is larger compared to the optical contrast obtained with the sample interface formed without the optical coating.

23. The method of claim 22,
wherein the excitation light is a first excitation light at a wavelength within a first wavelength band,
the method further comprising:
providing a second excitation light at a wavelength within a second wavelength band for a fluorescence excitation of the sample; and
imaging, at the detector, the nanoscale object by a fluorescence light emitted by the nanoscale object in response to the second excitation light and collected by the imaging lens.

24. The method of claim 23,
wherein the nanoscale object comprises a plurality of groups of fluorophores, each group having a different excitation spectrum, and
wherein the second excitation light is at a plurality of wavelengths for fluorescence excitation of the respective groups.

25. The method of claim 24,
the method further comprising:
receiving simultaneously the interference pattern and the fluorescence light on separate parts of a light-sensitive area of the detector.

26. The method of claim 22,
wherein the optical coating is configured such that the degree of reflection of the excitation light at the sample interface matches a degree of spurious reflection of the excitation light wherein the spurious reflection corresponds to part the excitation light which is reflected at the interfaces formed within the optical system other than the sample interface and subsequently is detected at the detector.

27. The method of claim 22,
wherein the optical coating is configured such that the degree of reflection of the excitation light at the sample interface is higher than a degree of spurious reflection of the excitation light at the interfaces formed within the optical system other than the sample interface and lower than the degree of reflection of the excitation light at the sample interface formed without the optical coating.

28. The method of claim 22,
wherein providing the excitation light comprises:
providing an optical power of the excitation light such that a photon shot noise of the excitation light impinging on the detector dominates a readout noise of the detector and such that an optical power of the excitation light impinging on the detector is below a saturation level of the detector.

29. The method of claim 22,
wherein the sample comprises an aqueous solution,
providing the sample comprises applying the aqueous solution to the substrate.

* * * * *